(12) United States Patent
Kim

(10) Patent No.: US 11,497,368 B2
(45) Date of Patent: Nov. 15, 2022

(54) CLEANING ROBOT, CONTROLLING METHOD THEREOF, AND CLEANING ROBOT CHARGING SYSTEM

(71) Applicant: Samsung Electronics Co., Ltd., Suwon-si (KR)

(72) Inventor: Jaemyong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 16/834,721

(22) Filed: Mar. 30, 2020

(65) Prior Publication Data

US 2020/0305670 A1 Oct. 1, 2020

(30) Foreign Application Priority Data

Mar. 28, 2019 (KR) .................. 10-2019-0035703

(51) Int. Cl.
   *A47L 9/28* (2006.01)
   *A47L 9/00* (2006.01)
   *G05D 1/02* (2020.01)

(52) U.S. Cl.
   CPC ............. *A47L 9/2852* (2013.01); *A47L 9/009* (2013.01); *A47L 9/2826* (2013.01);
   (Continued)

(58) Field of Classification Search
   CPC ........... A47L 2201/022; A47L 2201/04; A47L 9/009; A47L 9/2826; A47L 9/2852;
   (Continued)

(56) References Cited

U.S. PATENT DOCUMENTS 5,220,263 A * 6/1993 Onishi ................. G05D 1/0297
                                                318/587
8,224,487 B2    7/2012 Yoo et al.
(Continued)

FOREIGN PATENT DOCUMENTS

CN         107154664 A     9/2017
CN         108829111 A     11/2018
(Continued)

OTHER PUBLICATIONS

European Search Report dated Aug. 21, 2020 in connection with European Patent Application No. 20 16 6057, 8 pages.
(Continued)

*Primary Examiner* — Marc Carlson

(57) ABSTRACT

The disclosure relates to a cleaning robot, controlling method thereof, and cleaning robot charging system, and more particularly, to a technology for a cleaning robot to select a charging device by taking into account whether the charging device is occupied and a distance to the charging device when the charging device is returning to the charging device for charging. The cleaning robot includes a main body; a movement module moving the main body; a communication module configured to request identification information of a charging device occupied by another cleaning robot to the other cleaning robot; and a controller configured to determine a charging device not occupied by the other cleaning robot based on the identification information of the charging device received from the other cleaning robot through the communication module, and to control the movement module to move the main body to the non-occupied charging device.

20 Claims, 16 Drawing Sheets

(52) U.S. Cl.
CPC .......... *A47L 9/2873* (2013.01); *A47L 9/2884* (2013.01); *A47L 9/2889* (2013.01); *G05D 1/0225* (2013.01); *A47L 2201/022* (2013.01); *A47L 2201/04* (2013.01); *G05D 2201/0203* (2013.01)

(58) Field of Classification Search
CPC .... A47L 9/2873; A47L 9/2884; A47L 9/2889; B60L 2200/16; B60L 2260/32; B60L 53/66; B60L 53/67; B60L 58/12; G05D 1/0225; G05D 1/0291; G05D 2201/0203
See application file for complete search history.

(56) References Cited

U.S. PATENT DOCUMENTS

| | | | |
|---|---|---|---|
| 11,185,203 B2* | 11/2021 | Jeong | .................... H02J 7/0044 |
| 2018/0286147 A1* | 10/2018 | Naito | ................... G05D 1/0291 |

FOREIGN PATENT DOCUMENTS

| | | |
|---|---|---|
| CN | 109193854 A | 1/2019 |
| KR | 10-2010-0136904 A | 12/2010 |
| KR | 10-2012-0126772 A | 11/2012 |
| WO | 2012/083062 A1 | 6/2012 |

OTHER PUBLICATIONS

China National Intellectual Property Administration, "The First Office Action," dated Jul. 13, 2022, in connection with Chinese Patent Application No. 202010231322.2, 26 pages.

\* cited by examiner

CLEANING ROBOT, CONTROLLING METHOD THEREOF, AND CLEANING ROBOT CHARGING SYSTEM

CROSS-REFERENCE TO RELATED APPLICATION

This application is based on and claims priority under 35 U.S.C. § 119 to Korean Patent Application No. 10-2019-0035703 filed on Mar. 28, 2019, the disclosure of which is incorporated herein by reference in its entirety.

BACKGROUND

1. Field

The disclosure relates to a cleaning robot, a controlling method thereof, and a cleaning robot charging system, and more particularly, to a technology for a cleaning robot to select a charging device by considering whether the charging device is occupied and a distance to the charging device when the charging device is returning to the charging device for charging.

2. Description of Related Art

A cleaning robot is a device that automatically cleans a room by sucking up impurities, such as dust on the floor while autonomously moving about the room without user intervention. That is, the cleaning robot cleans the room while moving around the room.

In general, the cleaning robot automatically cleans the room along a route planned in the cleaning robot regardless of an intention of the user. The cleaning robot generates and follows a detour route to avoid an obstacle when detecting the obstacle while moving along the planned route.

The cleaning robot includes a battery. Electrical energy stored in the battery enables the cleaning robot to move around a room and suck up the dust. The cleaning robot cleans the space based on a charged battery, so when it is running out of the battery, the cleaning robot has to return to a charging station for charging the battery, and resumes the cleaning after charging.

When there are more than one cleaning robots and charging stations, it is common for a cleaning robot to return to a nearest charging station. Hence, a cleaning robot may collide with another cleaning robot at the nearest charging station at which the other cleaning robot is being charged. Furthermore, when the charging stations are not as many as the number of cleaning robots, the cleaning robots may conflict with each other for a charging station.

Accordingly, controlling the cleaning robot to move to a charging station other than an occupied charging station by obtaining information about the occupied charging station is becoming more important these days.

SUMMARY

The disclosure provides a cleaning robot, controlling method thereof, and cleaning robot charging system, by which a cleaning robot receives occupancy information of charging stations when returning to one of the charging stations for charging, and moves to a charging station other than the occupied charging station for charging.

According to an embodiment of the disclosure, a cleaning robot is provided.

The cleaning robot includes a main body including a battery; a movement module moving the main body; a communication module configured to request identification information of a charging device occupied by another cleaning robot to the other cleaning robot; and a controller configured to determine a charging device not occupied by the other cleaning robot based on the identification information of the charging device received from the other cleaning robot through the communication module, and to control the movement module to move the main body to the non-occupied charging device.

The non-occupied charging device may be in the plural, and the controller may calculate a straight distance between the main body and each of the plurality of non-occupied charging devices based on the identification information of the charging device, and control the main body to move to a charging device located at a shortest distance of the calculated straight distances.

The controller may determine a moving path to the non-occupied charging device from the main body, and when there is an obstacle in the moving path, determine a shortest route for the main body to avoid the obstacle and arrive at the non-occupied charging device.

The controller may determine a charging device to charge the main body based on the shortest route for the main body to avoid the obstacle and arrive at the non-occupied charging device, and control the movement module to move the main body to the determined charging device.

The identification information of the charging device may include whether the other cleaning robot docks with the charging device, time left until completion of charging of the other cleaning robot docking with the charging device, and a rate of charging progress of the other cleaning robot docking with the charging device.

The controller may determine one of the plurality of charging devices to charge the main body based on a rate of charging progress of each of the other cleaning robots docking with the plurality of charging devices when there is no non-occupied charging device among the plurality of charging devices.

The controller may determine a charging device docked with one of the other cleaning robots, which has 100% of the rate of charging progress, to charge the main body among the plurality of charging devices, when there is no non-occupied charging device among the plurality of charging devices, and control the movement module to move the main body to the determined charging device.

The cleaning robot may further include a storage storing position information of the charging devices located in a predefined area, and the controller may calculate a straight distance between the main body and each of the charging devices based on the position information of the charging device.

The cleaning robot may further include a docking module configured to detect docking between the main body and the charging device; and a data obtainer configured to obtain identification information of a charging device docked with the main body, and the storage may store the identification information of the charging device obtained when the main body docks with the charging device.

The communication module may transmit occupancy information of the charging device indicating whether the main body occupies the charging device to the other cleaning robot based on the obtained identification information of the charging device.

According to another embodiment of the disclosure, a controlling method of a cleaning robot is provided.

A controlling method of a cleaning robot including a main body having a battery and a movement module for moving the main body includes requesting identification information of a charging device occupied by another cleaning robot to the other cleaning robot; receiving the requested identification information from the other cleaning robot; determining a charging device not occupied by the other cleaning robot based on the received identification information of the charging device; and controlling the movement module to move the main body to the non-occupied charging device.

The controlling method may further include receiving identification information of a plurality of non-occupied charging devices; calculating a straight distance between the main body and each of the plurality of non-occupied charging devices based on the identification information of the charging device, and determining a charging device located at a shortest distance of the calculated straight distances to charge the main body; and controlling the main body to move to the determined charging device.

The controlling method may further include determining a moving path to the non-occupied charging device from the main body; and when there is an obstacle in the moving path, determining a shortest route for the main body to avoid the obstacle and arrive at the non-occupied charging device.

The controller may further include determining a charging device to charge the main body based on the shortest route for the main body to avoid the obstacle and arrive at the non-occupied charging device; and controlling the main body to move to the determined charging device.

The controlling method may further include determining one of the plurality of charging devices to charge the main body based on a rate of charging progress of each of the other cleaning robots docking with the plurality of charging devices when there is no non-occupied charging device among the plurality of charging devices.

The controlling method may further include determining a charging device docked with one of the other cleaning robots, which has 100% of the rate of charging progress, to charge the main body among the plurality of charging devices, when there is no non-occupied charging device among the plurality of charging devices; and controlling the main body to move to the determined charging device.

The controlling method may further include storing position information of the charging devices located in a predefined area; and calculating a straight distance between the main body and each of the charging devices based on the position information of the charging device.

The controlling method may further include detecting docking between the main body and the charging device; obtaining identification information of a charging device docked with the main body; and storing the identification information of the charging device obtained when the main body docks with the charging device.

The controlling method may further include transmitting occupancy information of the charging device indicating whether the main body occupies the charging device to the other cleaning robot based on the obtained identification information of the charging device.

According to another embodiment of the disclosure, a cleaning robot charging system is provided.

The cleaning robot charging system includes at least one charging device configured to charge a cleaning robot; a first cleaning robot configured to request occupancy information of the at least one charging device to another cleaning robot; and a second cleaning robot configured to detect docking with one of the at least one charging device, obtain identification information of the docked charging device, and transmit occupancy information of the docked charging device to the first cleaning robot based on the obtained identification information of the charging device, wherein the first cleaning robot is configured to, upon reception of the occupancy information of the charging device from the second cleaning robot, determine one of the at least one charging device to charge the first cleaning robot based on a distance between the first cleaning robot and each of the at least one charging device except for the charging device occupied by the second cleaning robot, and move to the determined charging device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
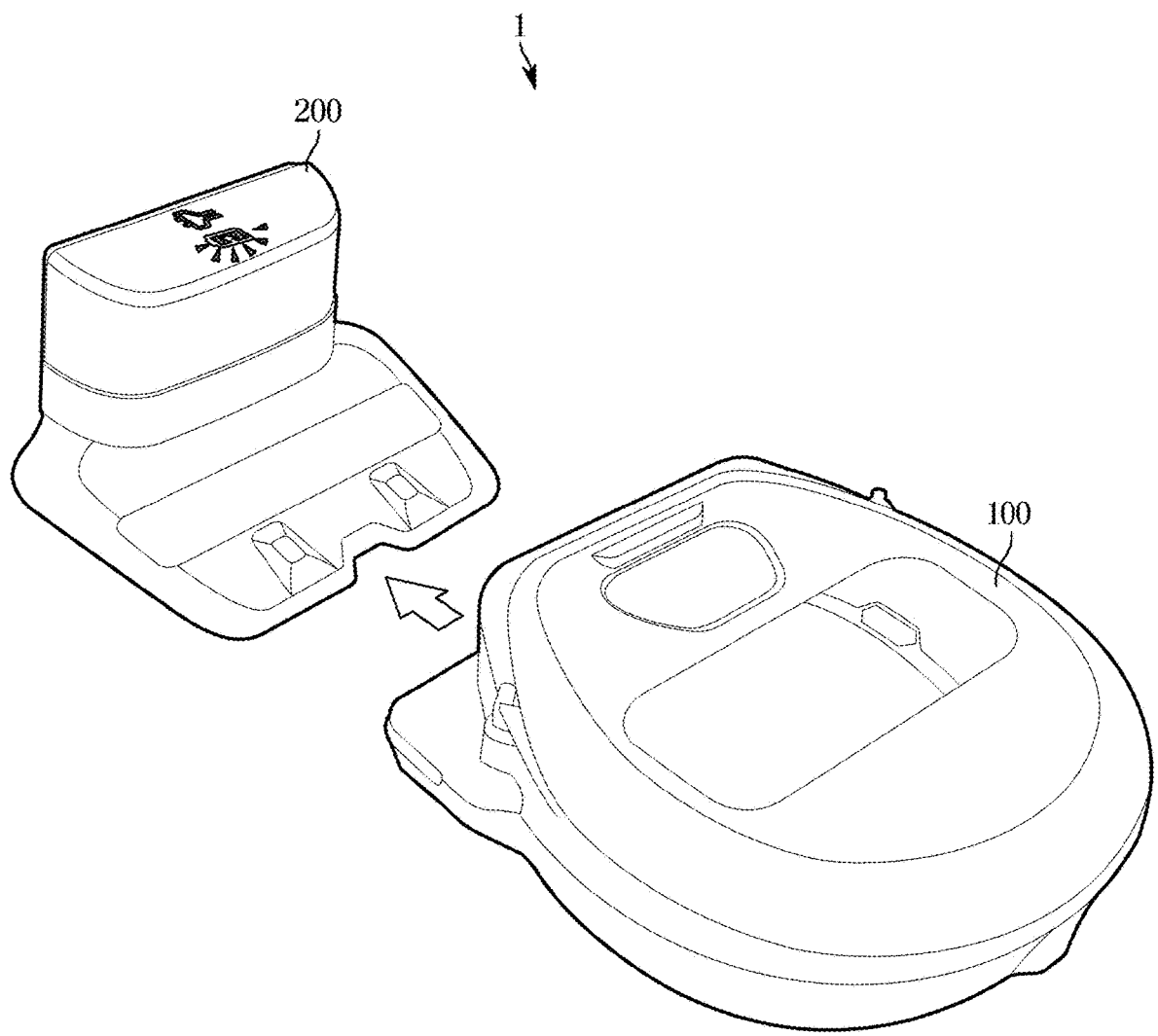
FIG. 1 illustrates a cleaning robot and a charging device, according to an embodiment of the disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like numerals refer to like elements throughout the specification. Not all elements of embodiments of the disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to accompanying drawings.

FIG. 1 illustrates a cleaning robot and a charging device, according to an embodiment of the disclosure.

Referring to FIG. 1, a cleaning robot charging system 1 includes a cleaning robot 100 and a charging device 200.

The cleaning robot 100 may clean the floor of space to be cleaned while moving about the space. The space to be cleaned is not particularly limited, and may be any space around which the cleaning robot 100 moves and cleans. For example, the space may include not only an indoor space such as a room, a living room, a hallway, an office room, or the inside of a gym but also an outdoor space.

The cleaning robot 100 may include a battery and use electrical energy stored in the battery to move itself around the space and clean the floor of the space. The electrical energy of the battery is consumed and the output voltage of the battery is reduced, while the cleaning robot 100 is moving around the space and cleaning the floor.

The cleaning robot 100 may operate normally at a voltage equal to or higher than a preset minimum voltage, and may stop operating at a voltage lower than the minimum output voltage of the battery. Hence, when the output voltage of the battery is reduced near to the minimum voltage, the cleaning robot 100 may move to the charging device 200 for charging the battery.

The charging device 200 may convert alternate current (ac) power received from an external power source (e.g., a domestic ac power source) to direct current (dc) power, and supply the dc power to the cleaning robot 100 to charge the battery of the cleaning robot 100.

The charging device 200 is fixed at a certain position (e.g., a place set by the user), and is settled unless it is under a special circumstance (e.g., an occasion when the user moves the charging device 200 to another position). As the charging device 200 is located at a set place, the cleaning robot 100 may move to the charging device 200 to charge its battery when the output voltage of the battery comes close to the minimum voltage while the cleaning robot 100 is moving around the space.

The cleaning robot 100 includes charging terminals exposed to the outside for charging the battery. The charging device 200 may include charging terminals exposed to the outside for charging the battery of the cleaning robot 100. When the charging terminals of the charging device 200 contact the charging terminals of the cleaning robot 100, the charging device 200 may apply a voltage to its charging terminals, and the cleaning robot 100 may charge the battery with the voltage applied across the charging terminals of the charging device 200.

The charging device 200 may use a non-contact type sensor or contact type sensor to identify whether the charging terminals of the charging device 200 come into contact with the charging terminals of the cleaning robot 100. The cleaning robot 100 may also use a non-contact type sensor or contact type sensor to identify whether the charging terminals of the charging device 200 come into contact with the charging terminal of the cleaning robot 100.

A configuration and operations of the cleaning robot 100 and the charging device 200 will now be described in detail.

Figure 2:
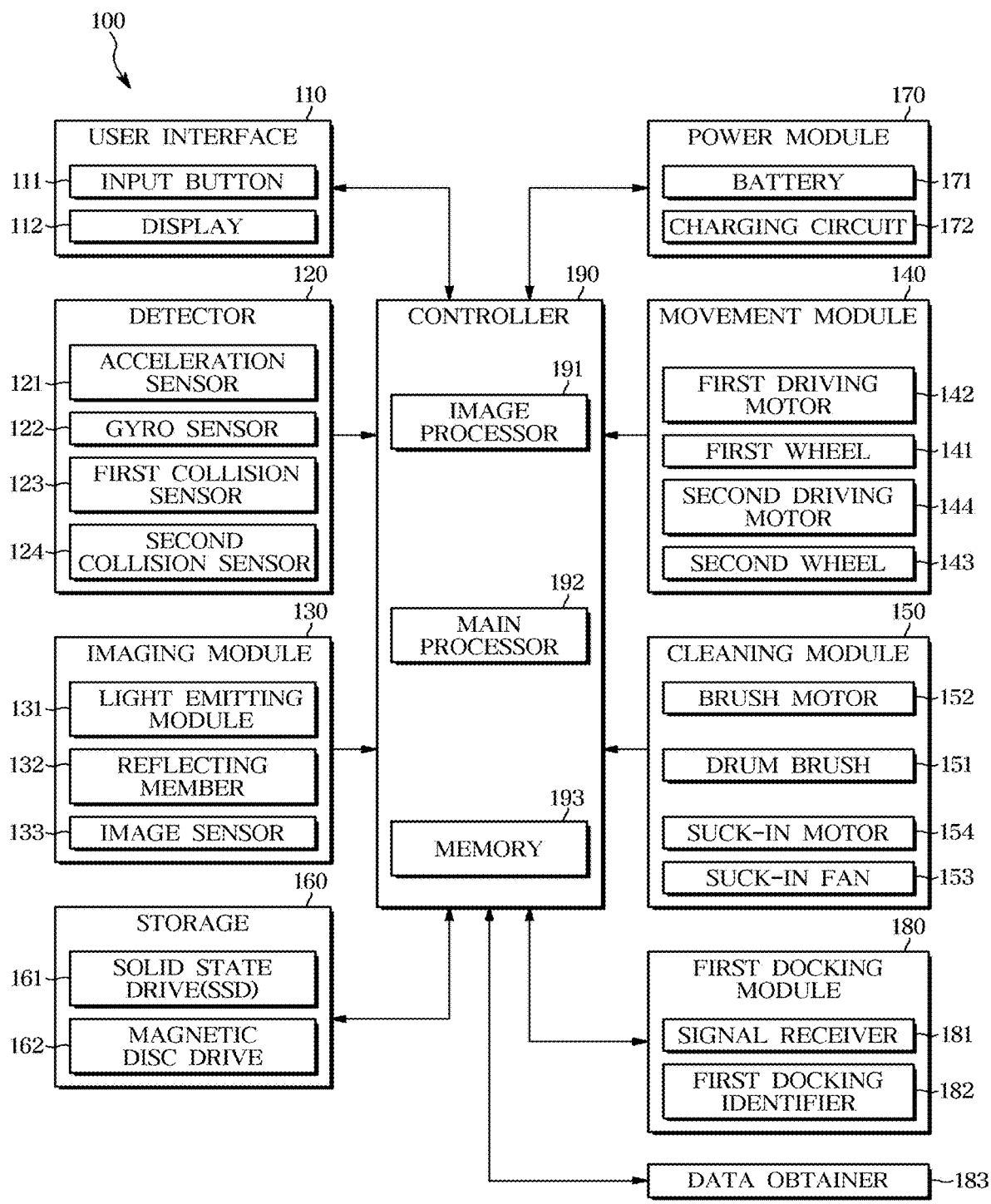
FIG. 2 illustrates a control block diagram of a cleaning robot, according to an embodiment of the disclosure.
Figure 3:
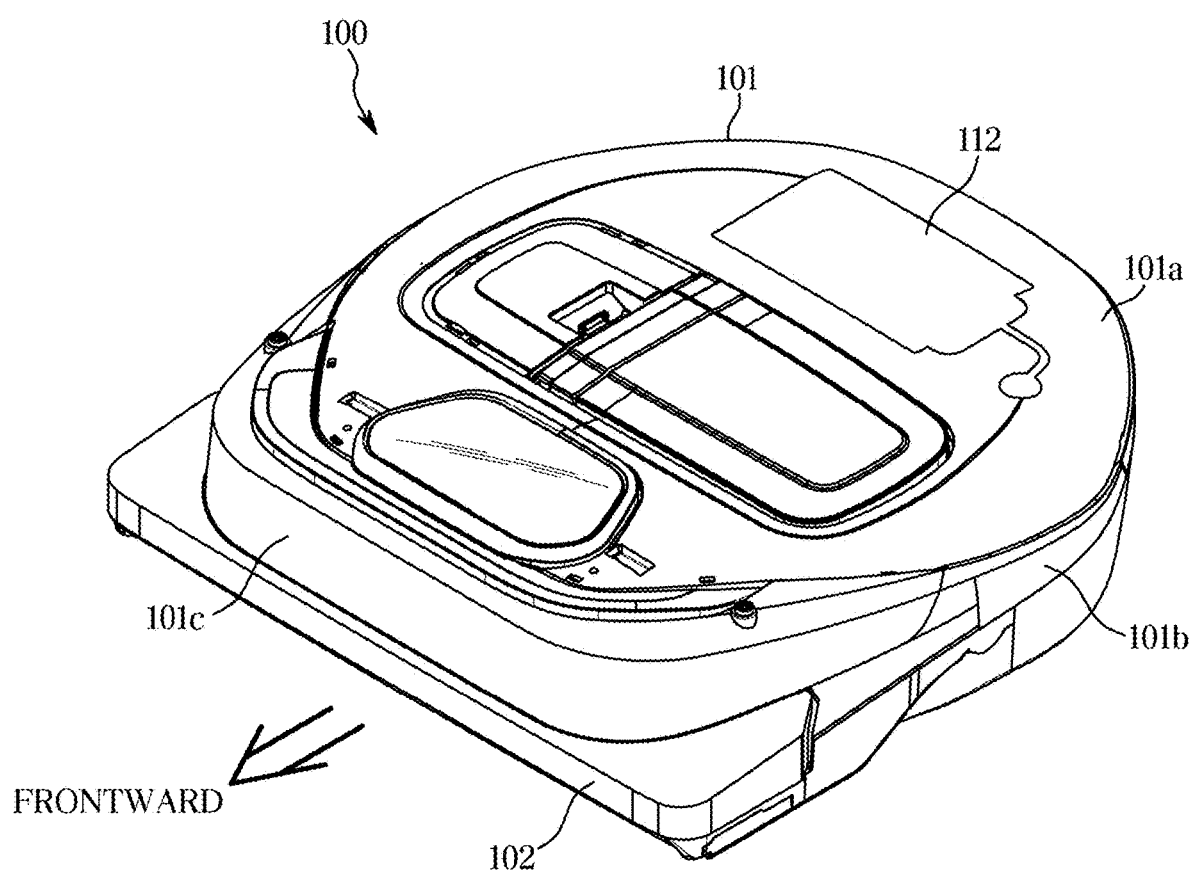
FIG. 3 illustrates an exterior view of a cleaning robot, according to an embodiment of the disclosure.
Figure 4:
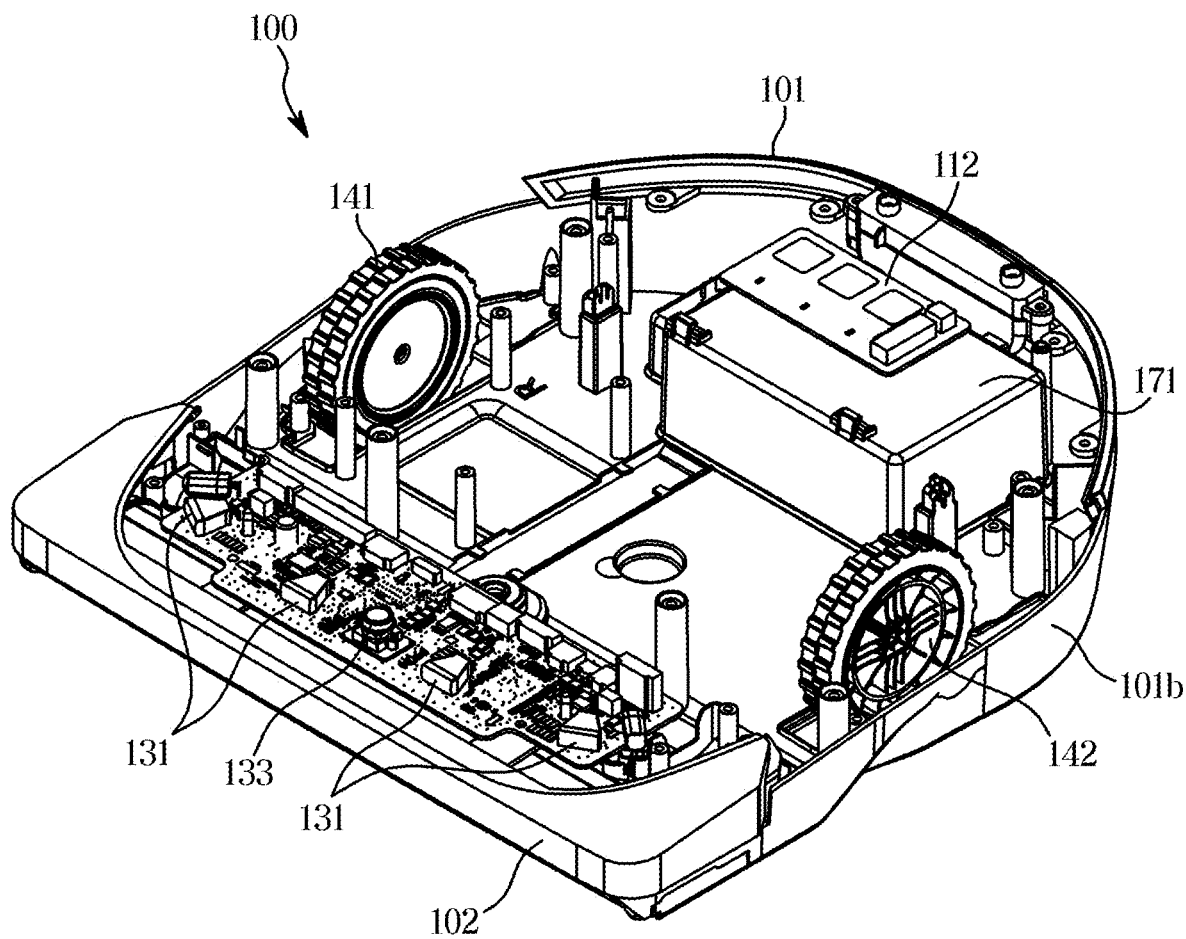
FIG. 4 illustrates an interior view of a cleaning robot, according to an embodiment of the disclosure.
Figure 5:
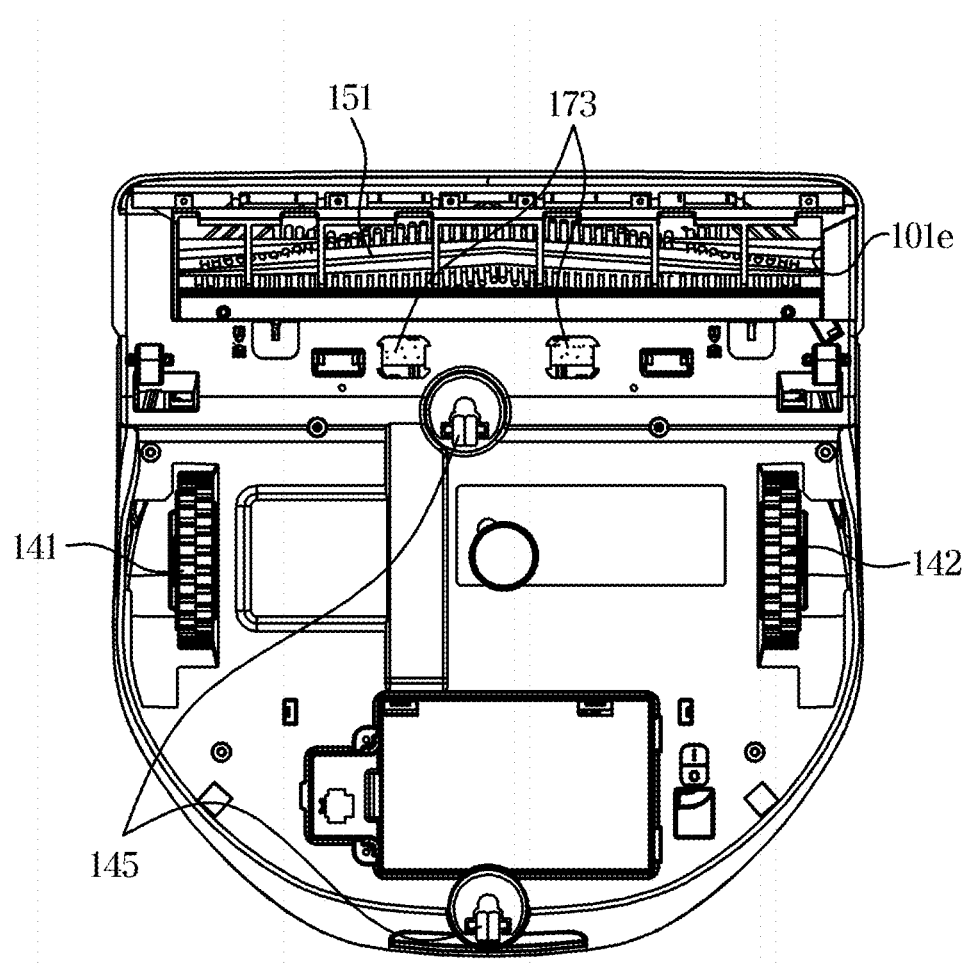
FIG. 5 illustrates a bottom view of a cleaning robot, according to an embodiment of the disclosure.
Figure 6:
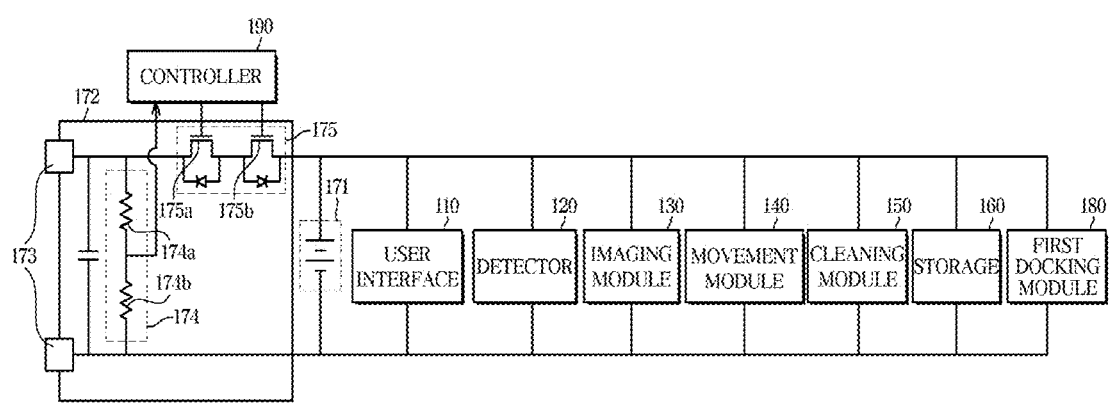
FIG. 6 illustrates a configuration of a power module included in a cleaning robot, according to an embodiment of the disclosure.
Figure 7:
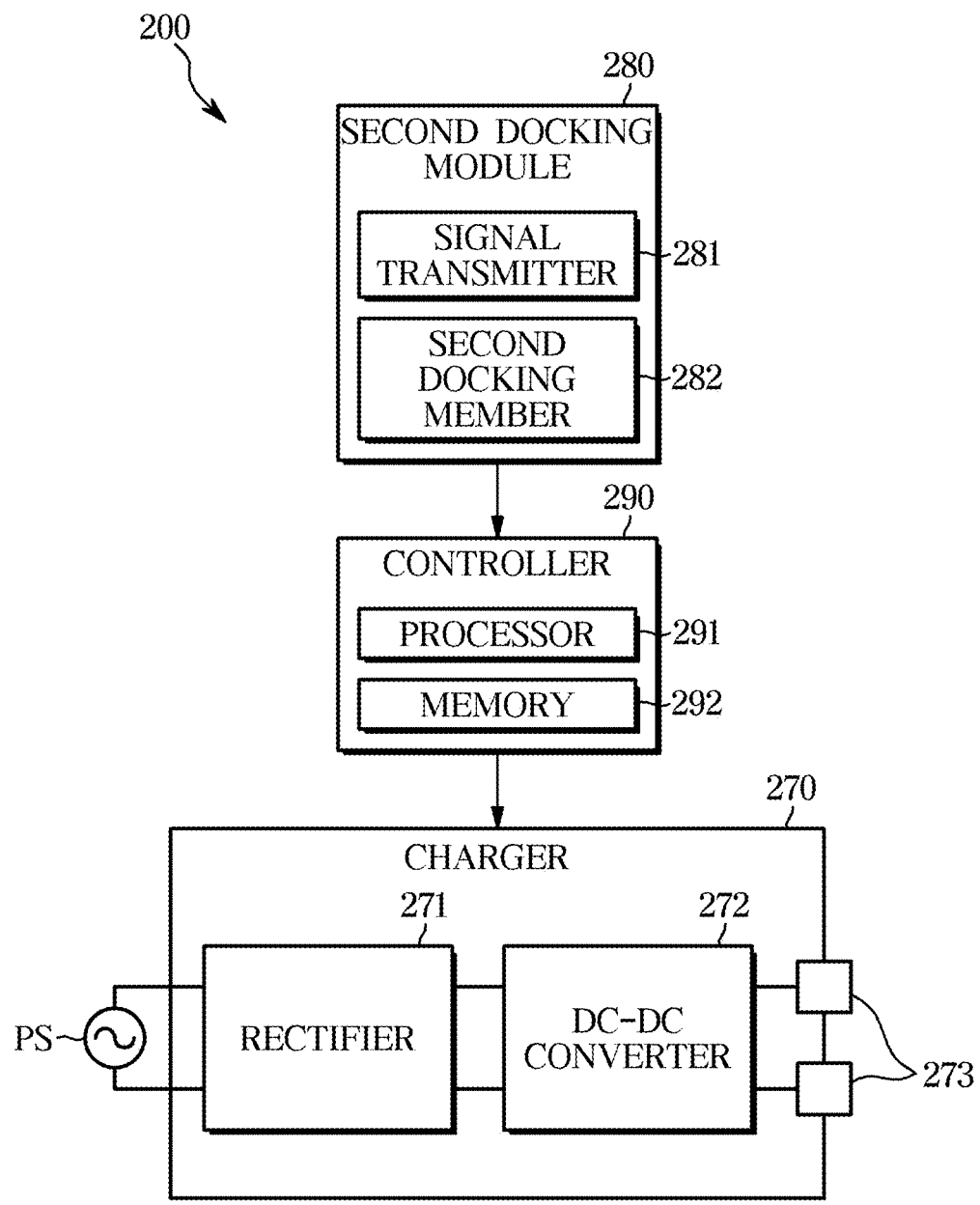
FIG. 7 illustrates a block diagram of a charging device, according to an embodiment of the disclosure.

FIG. 2 illustrates a control block diagram of a cleaning robot, according to an embodiment of the disclosure. FIG. 3 illustrates an exterior view of a cleaning robot, according to an embodiment of the disclosure. FIG. 4 illustrates an interior view of a cleaning robot, according to an embodiment of the disclosure. FIG. 5 illustrates a bottom view of a cleaning robot, according to an embodiment of the disclosure. FIG. 6 illustrates a configuration of a power module included in a cleaning robot, according to an embodiment of the disclosure. FIG. 7 illustrates a block diagram of a charging device, according to an embodiment of the disclosure.

Referring to FIGS. 2 to 6, the cleaning robot 100 may include a main body 101 and a bumper 102 arranged on the front of the main body 101.

The main body 101 may have a substantially cylindrical shape, as shown in FIG. 3. Specifically, the main body 101 may include a top face 101a almost circular in shape and a side face 101b formed along the edges of the top face 101a.

At least a portion of the side face 101b of the main body 101 may be flat. For example, a front face 101c formed on the front of the main body 101 may be substantially flat.

The bumper 102 may be formed on the front face 101c and may be flat on the front. The main body 101 may have a substantially cylindrical shape and the bumper 102 has the substantially flat side, so a bottom face 101d of the cleaning robot 100 may have nearly a combined shape of a half circle and a rectangle, as shown in FIG. 5.

The bumper 102 may reduce the impact of a collision with an obstacle on the main body 101 and may detect the collision. The obstacle may include an object, a person, or an animal that obstructs the way of the cleaning robot 100. For example, the obstacle may include a wall dividing the space, furniture located in the space, or an individual or animal present in the space.

The cleaning robot 100 may generally move with the bumper 102 facing forward, and as shown in FIG. 3, a direction in which the bumper 102 is headed may be defined as a 'forward direction' of the cleaning robot 100.

The cleaning robot 100 may include components arranged inside and outside of the main body 101 to implement (moving and cleaning) capabilities of the cleaning robot 100.

Specifically, the cleaning robot 100 may include a user interface 110, a detector 120, an imaging module 130, a movement module 140, a cleaning module 150, a storage 160, a power module 170, a first docking module 180, a data obtainer 183, a communication module 185, and a controller 190.

The components included in the cleaning robot 100 are not limited thereto, but may add some other components or omit some of the aforementioned components as needed.

Furthermore, the names of the components included in the cleaning robot 100 are not limited to what are called above. Each of the components included in the cleaning robot 100 may be also referred to as another name that indicates what performs the same function.

The user interface 110 may be arranged on the top face 101a of the main body 101, as shown in FIG. 3, and may include input buttons 111 and a display 112.

The input buttons 111 may receive control commands from the user. The input buttons 111 may include a power button for switching on or off the cleaning robot 100, an operation button for starting or stopping operation of the cleaning robot 100, and a return button for returning the cleaning robot 100 to the charging device 200 for charging.

The input buttons 111 may include a push switch and a membrane switch each activated by the pressure of the user, or a touch switch activated by the touch of a body part of the user.

The display 112 displays operational information of the cleaning robot 100 in response to an input entered by the user through the input buttons 111. For example, the display 112 may display an operation state of the cleaning robot 100, a battery charge state, a cleaning mode selected by the user, indication of whether to return to the charging device 200, etc.

The display 121b may include a Light Emitting Diode (LED) panel, an Organic Light Emitting Diode (OLED) panel, a Liquid Crystal Display (LCD) panel, or the like.

Alternatively, the display 112 may include a touch screen panel (TSP) for receiving control commands from the user and display operational information corresponding to the received control command.

The detector 120 may include an acceleration sensor 121 and a gyro sensor 122 for detecting motion of the cleaning robot 100.

The acceleration sensor 121 and the gyro sensor 122 may measure acceleration, moving velocity, motion displacement, and a moving direction of the cleaning robot 100 while the cleaning robot 100 is linearly moving. The acceleration sensor 121 and the gyro sensor 122 may also measure rotational speed, rotational displacement, and a rotation radius of the cleaning robot 100 while the cleaning robot 100 is turning.

The acceleration sensor 121 may detect linear motion. For example, the acceleration sensor 121 may measure linear acceleration, linear velocity, linear displacement, and the like of the cleaning robot 100 by using the Newton's second law of motion (the law of acceleration). The acceleration sensor 121 may include a Micro Electro Mechanical System (MEMS) type sensor miniaturized by combining micromechanical, microelectronic, and semiconductor process technologies.

The gyro sensor 122 may also be referred to as a gyroscope or an angular sensor that detects turning motion of the cleaning robot 100. Specifically, the gyro sensor 122 may measure angular velocity and displacement of rotation of a target by using the law of angular momentum conservation, Sagnac effect, Coriolis force, etc. The gyro sensor 122 may also include an MEMS type sensor. For example, of the MEMS type gyro sensors, a capacitive gyro sensor may detect tiny deformation of a mechanical structure due to the Coriolis force proportional to a rotational velocity from a change in capacitance, and derive the rotational speed from the change in capacitance.

The detector 120 may further include an encoder or hall sensor for detecting rotation of the wheel of the cleaning robot 100 to detect the motion of the cleaning robot 100. The encoder or hall sensor may detect rotation of a first wheel 141 and/or a second wheel 143 of the movement module 140. Based on the rotation of the first wheel 141 and/or the second wheel 143, motion of the cleaning robot 100 may be determined.

The detector 120 may send information about the motion of the cleaning robot 100 detected by the acceleration sensor 121 and/or the gyro sensor 122 to the controller 190.

The detector 120 may also include a first collision sensor 123 and a second collision sensor 124 for detecting a collision of the cleaning robot 100 with an obstacle.

The first and second collision sensors 123 and 124 may be arranged at different locations on the bumper 102, and may detect collisions in different directions.

The first and second collision sensors 123 and 124 may each send a collision signal to the controller 190 in response to a collision with an obstacle.

The imaging module 130 may acquire an image looking forward and/or upward from the cleaning robot 100 (hereinafter, referred to as a forward image and/or an upward image). The cleaning robot 100 may identify an obstacle in a moving path based on the forward image, and identify a location of the cleaning robot 100 based on the upward image.

The imaging module 130 may include a light emitting module 131, a reflecting member 132, and an image sensor 133.

The image sensor 133 may acquire an image. The image sensor 133 may include photo diodes that convert an optical image into electric image data. For example, the image sensor 133 may include a photo diode array in which photo diodes are arranged in two dimensions (2D). The image sensor 133 may further include a lens that focuses light onto the photo diode array.

The image sensor 133 may face upward, as shown in FIG. 4. For example, the image sensor 133 may be arranged such that the lens and the photo diode array face upward from the cleaning robot 100. At least a portion of the image sensor 133 may acquire the upward image of the cleaning robot 100.

The image sensor 133 may include photo diodes for detecting infrared rays, and thus acquire an infrared image. It is not, however, limited thereto, and the image sensor 133 may acquire a visible ray image or an ultraviolet image. The image sensor 133 may include a Complementary Metal Oxide Semiconductor (CMOS) sensor or a Charge Coupled Device (CCD) sensor.

The light emitting module 131 may emit light in the forward direction of the cleaning robot 100. For example, the light emitting module 131 may include a light emitting diode (LED) to emit light. The light emitting module 131 may further include a wide-angle lens that spreads the light emitted from the LED to directions parallel to the floor.

The reflecting member 132 may be provided on the top of the image sensor 133, and may reflect light incident thereon from the forward direction of the cleaning robot 100 toward the image sensor 133.

The light emitted from the light emitting module 131 may travel in all directions of the cleaning robot 100. When an obstacle is located in front of the cleaning robot 100, the obstacle reflects the light and a portion of the light may be incident onto the cleaning robot 100. The reflecting member 132 may reflect the light reflected from the obstacle to the image sensor 133.

The image sensor 133 may acquire the upward image and the forward image of the cleaning robot 100, the forward image including an obstacle, and send image data corresponding to the upward image and the forward image to the controller 190.

The movement module 140 may move the cleaning robot 100 in response to a control signal from the controller 190. The movement module 140 may include the first wheel 141, the second wheel 143, a first driving motor 142, and a second driving motor 144.

As shown in FIG. 5, the first wheel 141 may be installed on the left of the bottom face 101d of the cleaning robot 100, and the second wheel 143 may be installed on the right of the bottom face 101d of the cleaning robot 100. The first driving motor 142 may rotate the first wheel 141, and the second driving motor 144 may rotate the second wheel 143.

The first and second driving motors 142 and 144 may rotate the first and second wheels 141 and 143, respectively, upon reception of a control signal from the controller 190. Furthermore, the first wheel 141 may be rotated by the first driving motor 142 independently from the rotation of the second wheel 143, and the second wheel 143 may be rotated by the second driving motor 144 independently from the rotation of the first wheel 141.

These separate rotations of the first and second wheels 141 and 143 may enable the cleaning robot 100 to move in various forms, such as moving forward, moving backward, turning around, turning in the same place, etc. For example, when the first and second wheels 141 and 143 are rotated in the same direction at the same speed, the cleaning robot 100 may move forward or move backward. When the first and second wheels 141 and 143 are rotated in the same direction at different speeds, the cleaning robot 100 may curve to the left or to the right. Furthermore, when the first and second wheels 141 and 143 are rotated in different directions at the same speed, the cleaning robot 100 may turn clockwise or counterclockwise in the same place.

The movement module 140 may further include parts 145 installed on the bottom face 101d of the main body 101. As the cleaning robot 100 moves, rotation shafts of the parts 145 may be rotated, and may, accordingly, support the main body 101 without interfering with the motion of the cleaning robot 100.

The cleaning module 150 includes a drum brush 151, a brush motor 152, a suck-in fan 153, and a suck-in motor 154.

The drum brush 151 is arranged in a dust inlet 101e formed at the bottom face 101d of the main body, as shown in FIG. 5. The drum brush 151 may stir the dust on the floor into the dust inlet 101e while being rotated around a rotation shaft arranged in parallel with the floor.

The brush motor 152 may be arranged next to the drum brush 151 for rotating the drum brush 151 in response to a control signal from the controller 190. The brush motor 152 may drive the drum brush 151 to be rotated forward (such that a contact part between the drum brush 151 and the floor is moved from front to back) or backward (such that the contact part between the drum brush 151 and the floor is moved from back to front) based on the moving direction of the cleaning robot 100. For example, when the cleaning robot 100 moves forward, the brush motor 152 may drive the drum brush 151 to be rotated forward, and when the cleaning robot 100 moves backward, the brush motor 152 may drive the drum brush 151 to be rotated backward.

The suck-in fan 153 may be provided inside the main body 101 for sucking up the dust stirred by the drum brush 151.

The suck-in motor 154 may be mounted near the suck-in fan 153 for rotating the suck-in fan 153 according to a control signal from the controller 190.

Furthermore, the cleaning module 150 may include a dust container for storing the dust sucked in by the suck-in fan 153.

The storage 160 may store a control program and control data for controlling operation of the cleaning robot 100 and store various application programs and application data for performing various functions in response to inputs from the user. For example, the storage 160 may include an operating system (OS) program for managing configurations and resources (in software and/or hardware) included in the cleaning robot 100, an image processing program for processing image data acquired by the imaging module 130, a motor control program for controlling the first and second driving motors 142 and 144 included in the movement module 140, etc.

The storage 160 may serve as an auxiliary memory device of a memory 193 included in the controller 190. For example, part of data stored in the memory 193 may be stored in the storage 160.

The storage 160 may store a driving record generated by the driving of the cleaning robot 100, and map data generated based on the driving record. For example, the storage 160 may store driving records, such as a moved distance, a moving direction, moving speed, etc., detected by the detector 120 while the cleaning robot 100 is moving. The storage 160 may store the map data generated by the controller 190 based on the driving record.

The storage 160 may store position information of at least one charging device 200 located in a predefined area, and data about identification information of the charging device 200 obtained when the cleaning robot 100 docks with the charging device 200.

In addition, the storage 160 may store data related to the cleaning robot 100 docking with the charging device 200 and being charged, and the data may be shared with other cleaning robots.

The storage 160 may include a non-volatile memory that preserves the stored program or data even if the power is out. For example, the storage 160 may include a solid state drive (SSD) 161, a hard disc drive (HDD) 162, or the like.

The power module 170 includes a battery 171 and a charging circuit 172.

The battery 171 may store electrical energy to move the cleaning robot 100. The battery 171 may convert the electrical energy to chemical energy and store the chemical energy. This is called the battery 171 being charged. Furthermore, the battery 171 may convert the chemical energy to electrical energy and output the electrical energy (in a voltage and current). This is called the battery 171 being discharged.

The battery 171 may supply the electrical energy to the electric components included in the cleaning robot 100. Specifically, the battery 171 may apply a voltage and current to the user interface 110, the detector 120, the imaging module 130, the movement module 140, the cleaning module 150, the storage 160, the first docking module 180, and the controller 190.

The charging circuit 172 may charge the battery 171 with the power supplied from the charging device 200. The charging circuit 172 includes a first charging terminal 173 that comes into contact with the charging device 200 to receive power from the charging device 200, a divider 174 for detecting the voltage applied to the first charging terminal 173, and a switch 175 that allows or blocks the connection between the first charging terminal 173 and the battery 171.

The first charging terminal 173 may contact the charging terminal provided at the charging device 200 and may be exposed to the outside to come into contact with the charging terminal of the charging device 200. The first charging terminal 173 may apply a voltage applied to the charging terminal of the charging device 200 to the battery 171.

The divider 174 may divide a charge voltage (a voltage to charge the battery) applied by the charging device 200 to the first charging terminal 173 to detect the charge voltage. The divider 174 may scale down the voltage applied to the first charging terminal 173 at a certain percentage.

For example, the charging device 200 may apply the voltage of about 24.9 volts (V) to the first charging terminal 173, and the divider 174 may divide the voltage across the first charging terminal 173 in the proportion of 1:4 and output ⅕ voltage of the voltage across the first charging terminal 173 to the controller 190. The controller 190 may use an analog-to-digital converter to detect the voltage output from the divider 174, and estimate the voltage applied to the first charging terminal 173.

The divider 174 may include a first resistor 174a and a second resistor 174b connected in series. The divider 174 may output a voltage at a node between the first and second resistors 174a and 174b, and the voltage output from the divider 174 may be determined based on a ratio between electric resistances of the first and second resistors 174a and 174b, and the voltage across the first charging terminal 173.

The controller 190 may identify whether the cleaning robot 100 docks with the charging device 200 based on the magnitude of the voltage output from the divider 174. In other words, the controller 190 may determine whether the charging terminal of the cleaning robot 100 makes contact with the charging terminal of the charging device 200 based on the magnitude of the voltage output from the divider 174. For example, when it is determined that a charge voltage of the charging device 200, e.g., 24.9V, is applied to the first charging terminal 173, the controller 190 may determine that the charging terminal of the cleaning robot 100 makes contact with the charging terminal of the charging device 200.

The switch 175 may allow or block connection between the first charging terminal 173 and the battery 171 in response to a control signal from the controller 190. The switch 175 may include a first switch 175a and a second switch 175b. The first and second switches 175a and 175b may be connected in series between the first charging terminal 173 and the battery 171, and may be closed (turned on) or opened (turned off) in response to a charge control signal from the controller 190.

The first switch 175a and the second switch 175b may include Metal Oxide Semiconductor Field Effect transistors (MOSFETs), or Bipolar Junction Transistors (BJTs). The first and second switches 175a and 175b may include mechanical switches, such as relays that operate according to an electrical signal.

The first docking module 180 includes a signal receiver 181 and a first docking identifier 182.

The signal receiver 181 may wirelessly receive an inductive signal transmitted from the charging device 200. The charging device 200 may wirelessly output the inductive signal to guide the cleaning robot 100 to dock with the charging device 200.

The signal receiver 181 may include a plurality of receivers arranged along the outer surface of the cleaning robot 100, and each of the plurality of receivers may send a signal wirelessly received from the charging device 200 or an electrical signal corresponding to the received signal to the controller 190.

The controller 190 may determine an approximate location of the charging device 200 based on the inductive signal received by the signal receiver 181. For example, the controller 190 may determine a direction in which the charging device 200 is located based on a location where one of the plurality of receivers that has received the inductive signal from the charging device 200 is installed. Furthermore, the controller 190 may control the movement module 140 for the cleaning robot 100 to move to the charging device 200 based on the direction in which the charging device 200 is located.

The charging device 200 may output rays, radio waves or ultrasound to guide the cleaning robot 100. The signal receiver 181 may receive the rays, radio waves or ultrasound output from the charging device 200. Each of the plurality of receivers may include an antenna, a photo diode, an ultrasonic microphone, or the like, depending on whether the charging device 200 outputs rays, radio waves or ultrasound.

The first docking identifier 182 may be provided to identify whether the cleaning robot 100 docks with the charging device 200. The first docking identifier 182 may identify a second docking member arranged in the charging device 200, or the second docking member may identify the first docking identifier 182.

The first docking identifier 182 may send a docking identification signal representing whether the second docking member arranged in the charging device 200 is identified to the controller 190. The controller 190 may identify whether the cleaning robot 100 docks with the charging device 200 based on the docking identification signal output from the first docking identifier 182. Furthermore, the controller 190 may close (turn on) the switch 175 to charge the battery 171 based on the voltage applied to the first charging terminal 173.

The data obtainer 183 may obtain identification information of the charging device 200 when the cleaning robot 100 docks with the charging device 200. Specifically, the data obtainer 183 may obtain data such as identification (ID), an ID number, etc., of the charging device 200 and send the data to the controller 190.

The data obtainer 183 may be implemented with a short-range communication module, such as an near field communication (NFC) module, or may be implemented in such a form that obtains the identification information of the charging device 200 by scanning a barcode on the charging device 200. Alternatively, the data obtainer 183 may obtain the identification information of the charging device 200 by infrared (IR) communication, or may be implemented in the form of a camera that obtains the identification information by capturing the charging device 200. The data obtainer 183 may be implemented in any form that may obtain the identification information of the charging device 200.

The communication module 185 may transmit or receive various types of data related to operations and charging states of the cleaning robot 100. The communication module 185 may request information about whether at least one charging device is occupied, i.e., occupancy information of at least one charging device, from another cleaning robot. The communication module 185 may then receive the occupancy information of the charging device from the other cleaning robot. The occupancy information of a charging device refers to identification information of a charging device occupied by another cleaning device.

When the cleaning robot 100 docks with the charging device 200 and is charged, the communication module 185 may transmit the occupancy information of the charging device 200 indicating that the cleaning robot 100 occupies the charging device 200 to another cleaning robot based on the identification information of the charging device 200 obtained by the data obtainer 183.

The communication module 185 may be implemented with a communication chip, an antenna, and associated parts to connect to at least one of a wired communication network or a wireless communication network. That is, the communication module 185 may be implemented in various types that enable short-range communication or remote communication with another cleaning robot.

The controller 190 may control the components included in the cleaning robot 100, and may include an image processor 191, a main processor 192, and a memory 193.

The image processor 191 may receive image data acquired by the imaging module 130 and process the image data. The image processor 191 may obtain a distance to an obstacle and an angle of direction of the obstacle by processing data corresponding to the forward image among the image data. The image processor 191 may also obtain a moving speed and a moving direction of the cleaning robot 100 by processing data corresponding to the upward image among the image data. The image processor 191 may output information about an obstacle in front of the cleaning robot 100 and information about motion of the cleaning robot 100 by processing image data from the image module 130.

The main processor 192 may receive an output from the detector 120 and an output from the image processor 191 to generate a movement control signal to control the movement module 140 and a cleaning control signal to control the cleaning module 150. The main processor 192 may generate a driving record of the cleaning robot 100 based on the moving speed and moving direction output from the sensors of the detector 120 and the moving speed and moving direction output from the image processor 191, and store the driving record in the storage 160. The main processor 192 may generate map data representing features of the space being cleaned based on the driving record stored in the storage 160. The main processor 192 may generate a moving path to clean the floor of the space based on the map data, generate and output a movement control signal to the movement module 140 to drive the cleaning robot 100 along the moving path.

The main processor 192 may receive the distance to an obstacle and the angle of direction of the obstacle from the image processor 191, generate a movement control signal to avoid the obstacle based on the distance to the obstacle and the angle of direction of the obstacle, and output the movement control signal to the movement module 140. The main processor 192 may determine a direction in which the charging device 200 is located based on a signal output from the signal receiver 181, and send a movement control signal to the movement module 140 to drive the cleaning robot 100 to the charging device 200.

The main processor 192 may receive a docking identification signal output from the first docking identifier 182, and identify whether the cleaning robot 100 docks with the charging device 200 based on the docking identification signal.

The memory 193 may load a program and data from the storage 160 to control operation of the cleaning robot 100, and provide the program and data to the image processor 191 and the main processor 192.

The memory 193 may temporarily store a user input received through the user interface 110, a detection signal output from the detector 120, image data output from the imaging module 130, information about an obstacle and motion output from the image processor 191, and various control signals output from the main processor 192.

Upon reception of the occupancy information of at least one charging device from at least one cleaning robot through the communication module 185, the controller 190 may determine a charging device to charge the cleaning robot 100 based on a distance between each of the at least one charging device except (an) occupied charging device(s) and the cleaning robot 100. In addition, the controller 190 may control the movement module 140 to move the cleaning robot 100 to the determined charging device 200.

A configuration and operation of the charging device 200 will now be described.

Referring to FIG. 7, the charging device 200 may include a base, and a main body protruding from the base. The base includes a plane substantially parallel to or a bit slanted from the floor. A second charging terminal 273 is arranged on the plane of the base, which makes contact with the first charging terminal 173 of the cleaning robot 100.

The charging device 200 may include components arranged inside and outside of the main body 201 to implement (charging) capabilities of the charging device 200.

The charging device 200 may include a charger 270, a second docking module 280, and a charging controller 290. The charging controller 290 may include a processor 291 and a memory 292.

The charger 270 may convert ac power from an external power source (PS) to dc power to charge the battery 171 of the cleaning robot 100, and supply the dc power to the cleaning robot 100. The charger 270 may include a rectifier 271, a dc-dc converter 272, and the second charging terminal 273.

The rectifier 271 may receive the ac power from the external PS, convert the ac power to dc power, and output the dc power. For example, the rectifier 271 may include bridge diodes to convert the polarities of an ac voltage and ac current to a positive voltage and positive current, and a capacitor to eliminate ripples of the positive voltage.

The dc-dc converter 272 may adjust the voltage of the dc power rectified by the rectifier 271. For example, the dc-dc converter 272 may convert the voltage of the dc power rectified by the rectifier 271 to about 24.9V.

Although the charging device 200 is described to include the rectifier 271 and the dc-dc converter 272, it is not limited thereto. For example, the charging device 200 may include a transformer (or an ac-ac converter) and a rectifier.

The second charging terminal 273 may contact the first charging terminal 173 of the cleaning robot 100, and may be exposed to the outside to come into contact with the first charging terminal 173 of the cleaning robot 100. The second charging terminal 273 may apply the dc voltage output from the dc-dc converter 272 to the first charging terminal 173 of the cleaning robot 100.

When the second charging terminal 273 makes contact with the first charging terminal 173, the voltage output from the charger 270 of the charging device 200 is applied to the battery 171 of the cleaning robot 100, and the current output from the charger 270 of the charging device 200 may be applied to the battery 171 of the cleaning robot 100.

The second docking module 280 includes a signal transmitter 281 and a second docking identifier 282.

The signal transmitter 281 may wirelessly output an inductive signal to guide the cleaning robot 100 to dock with the charging device 200.

The signal transmitter 281 may output a plurality of inductive signals to guide the cleaning robot 100. For example, the signal transmitter 281 may transmit the plurality of inductive signals from the main body 201 of the charging device 200 in different directions.

Figure 8:
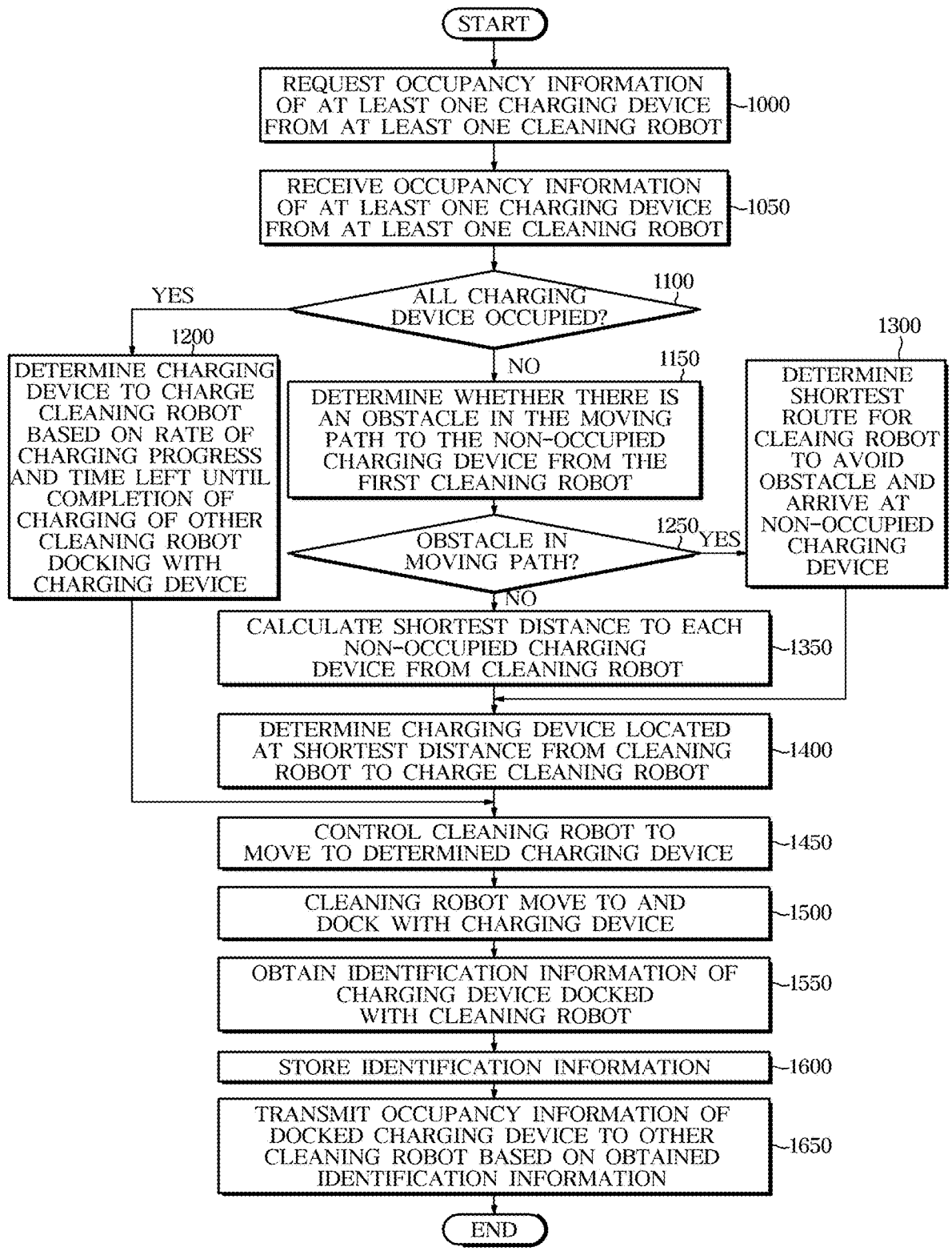
FIG. 8 is a flowchart illustrating a controlling method of a cleaning robot, according to an embodiment of the disclosure.
Figure 9:
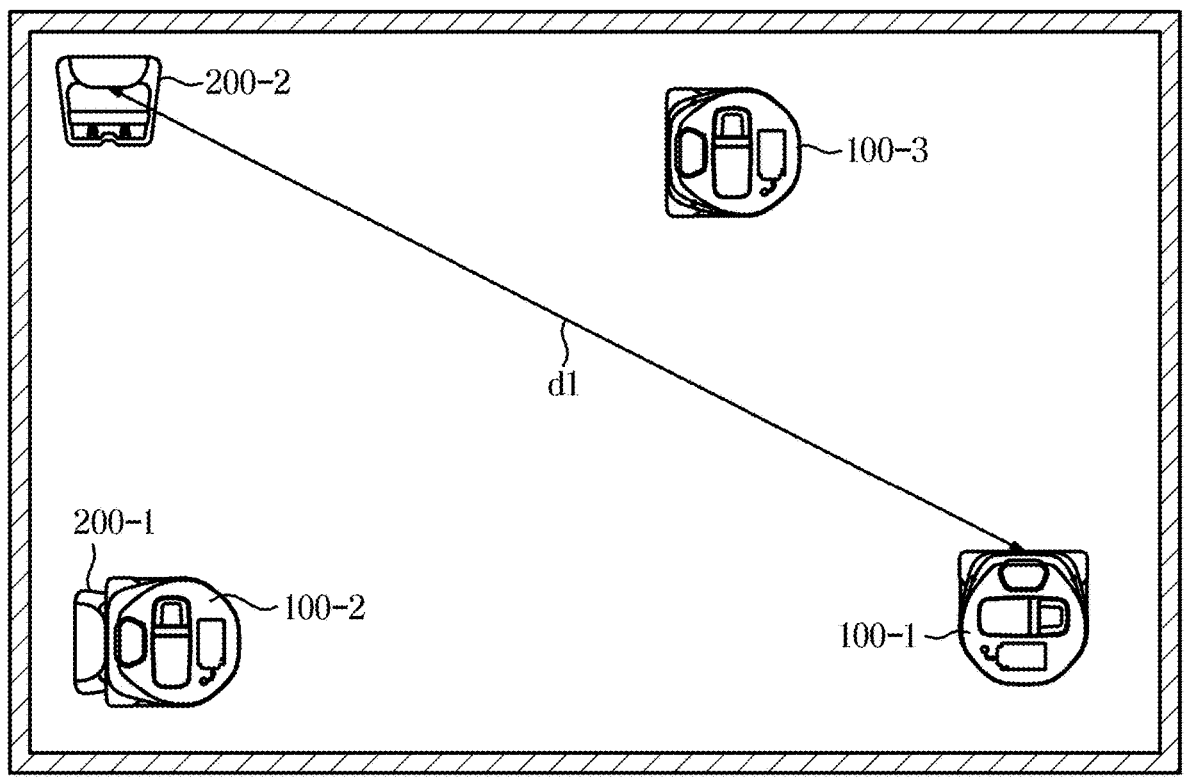
FIG. 9 illustrates how a cleaning robot determines a charging device for charging based on the shortest distance between charging devices and the cleaning robot.
Figure 10:
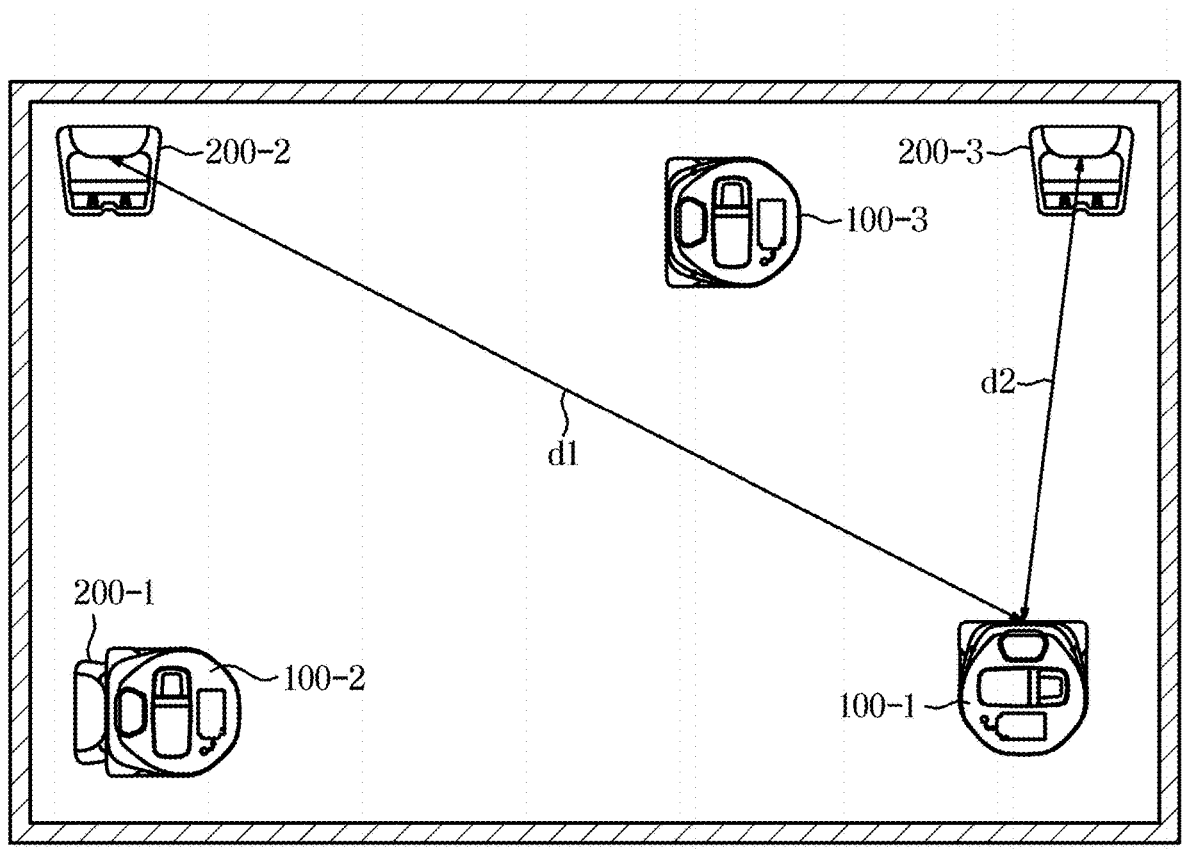
FIG. 10 illustrates how a cleaning robot determines a charging device for charging based on the shortest distance between charging devices and the cleaning robot.
Figure 11:
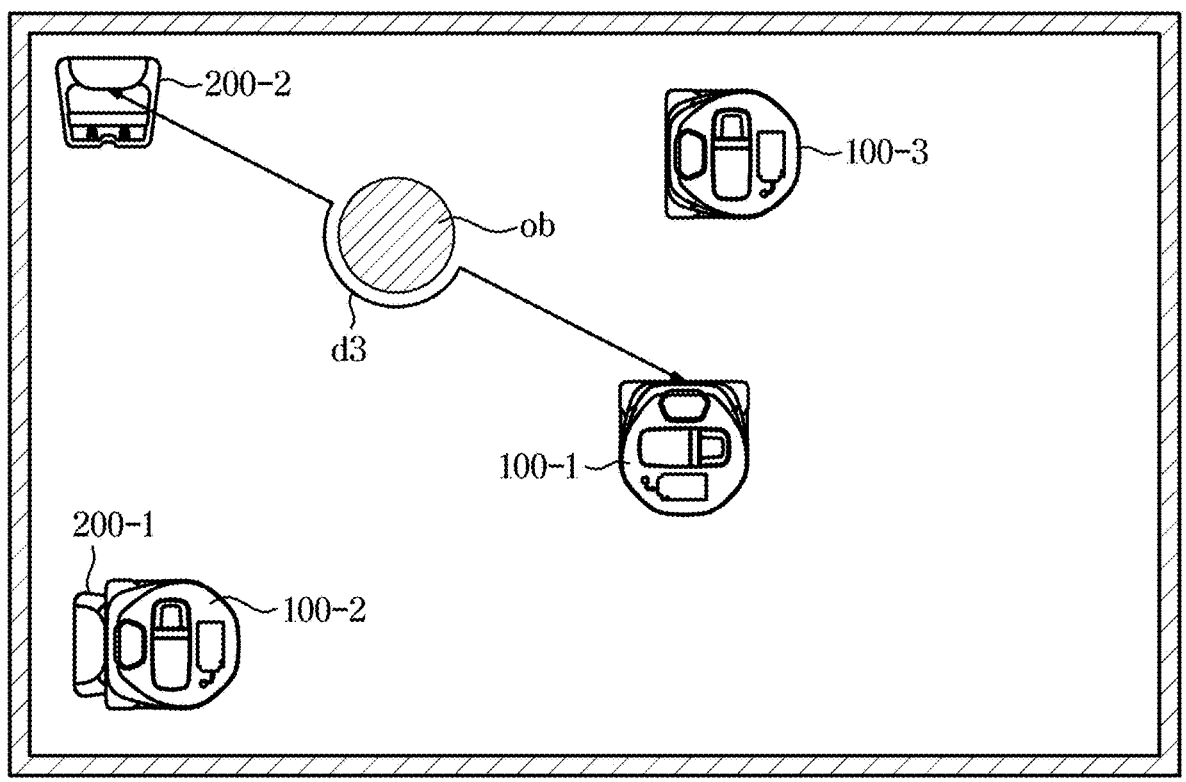
FIG. 11 illustrates how a cleaning robot determines a charging device for charging based on the shortest route for the cleaning robot to avoid an obstacle and arrive at a charging device, according to an embodiment of the disclosure.
Figure 12:
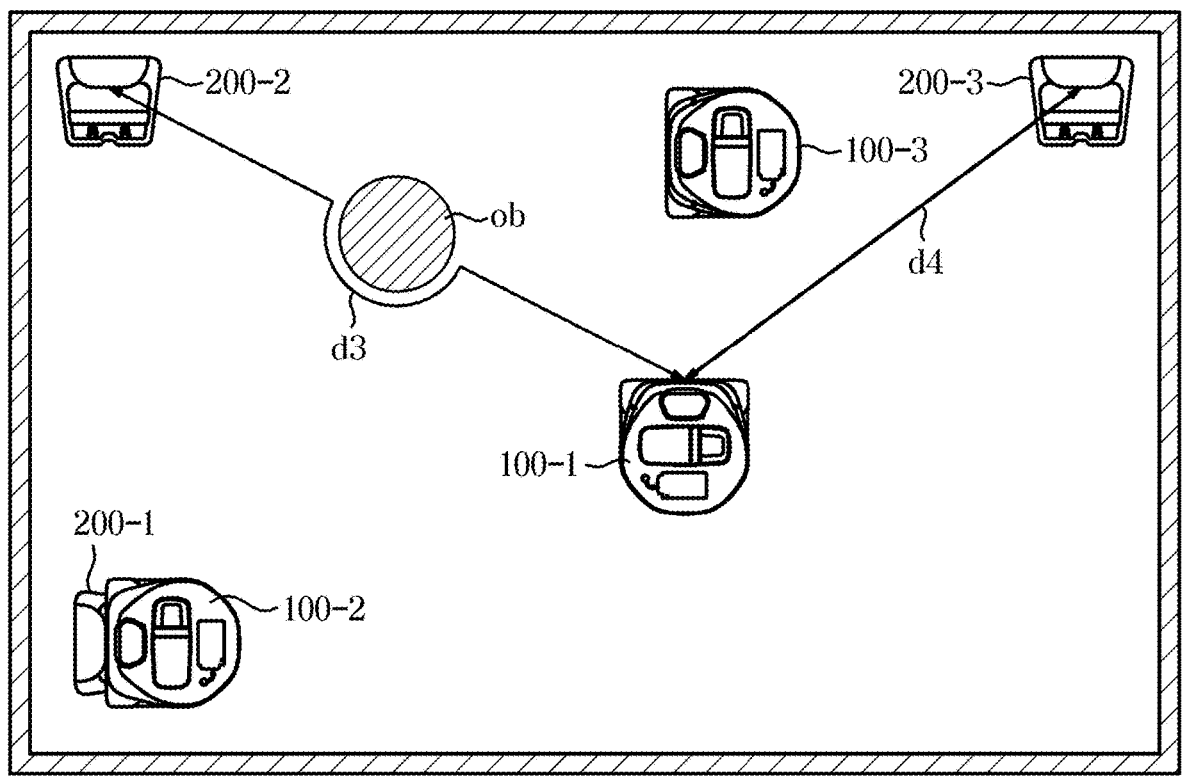
FIG. 12 illustrates how a cleaning robot determines a charging device for charging based on the shortest route for the cleaning robot to avoid an obstacle and arrive at a charging device, according to an embodiment of the disclosure.
Figure 13:
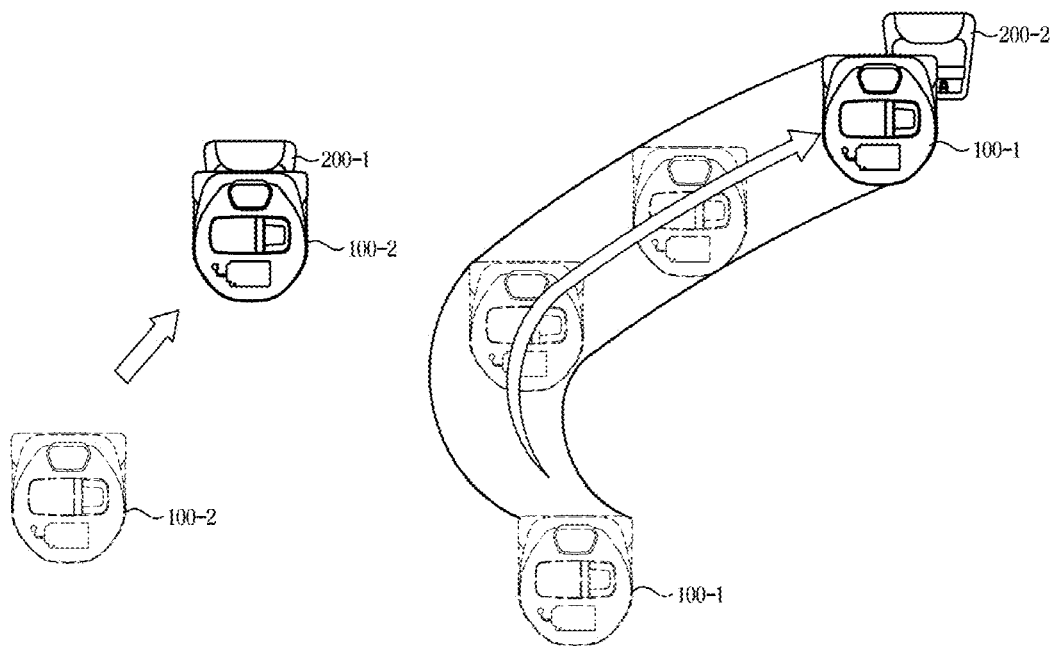
FIG. 13 illustrates how to select a charging device when a plurality of cleaning robots share charging devices, according to an embodiment of the disclosure.
Figure 14:
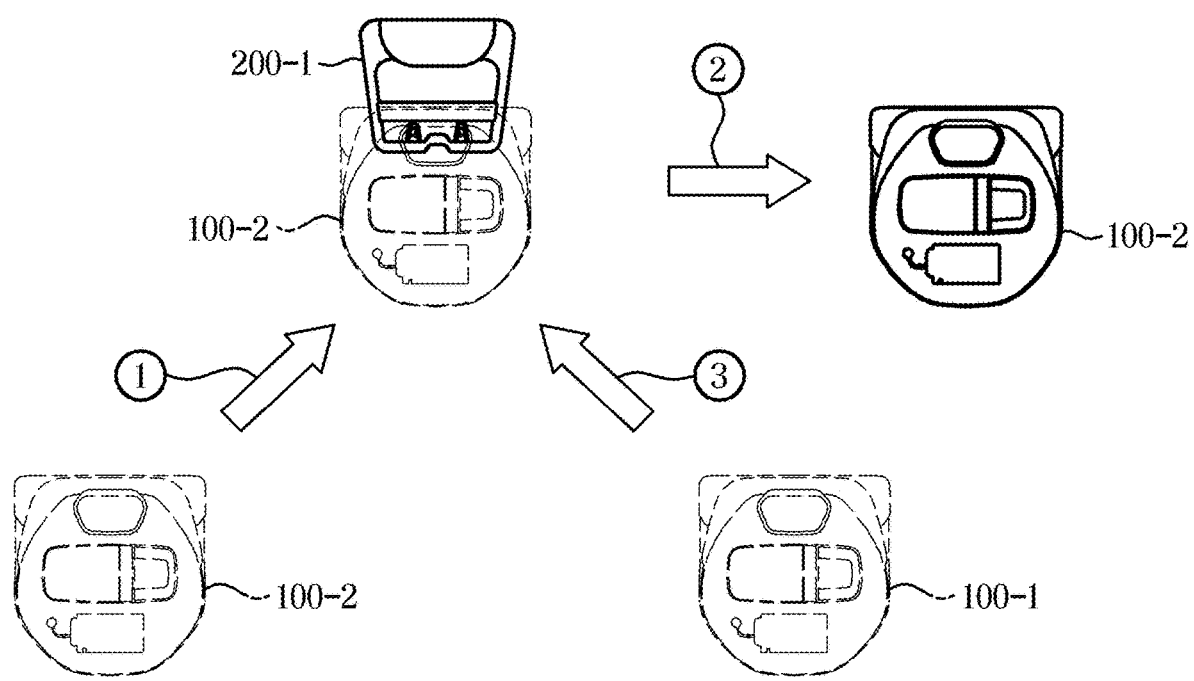
FIG. 14 illustrates how to select a charging device when a plurality of cleaning robots share charging devices, according to an embodiment of the disclosure.
Figure 15:
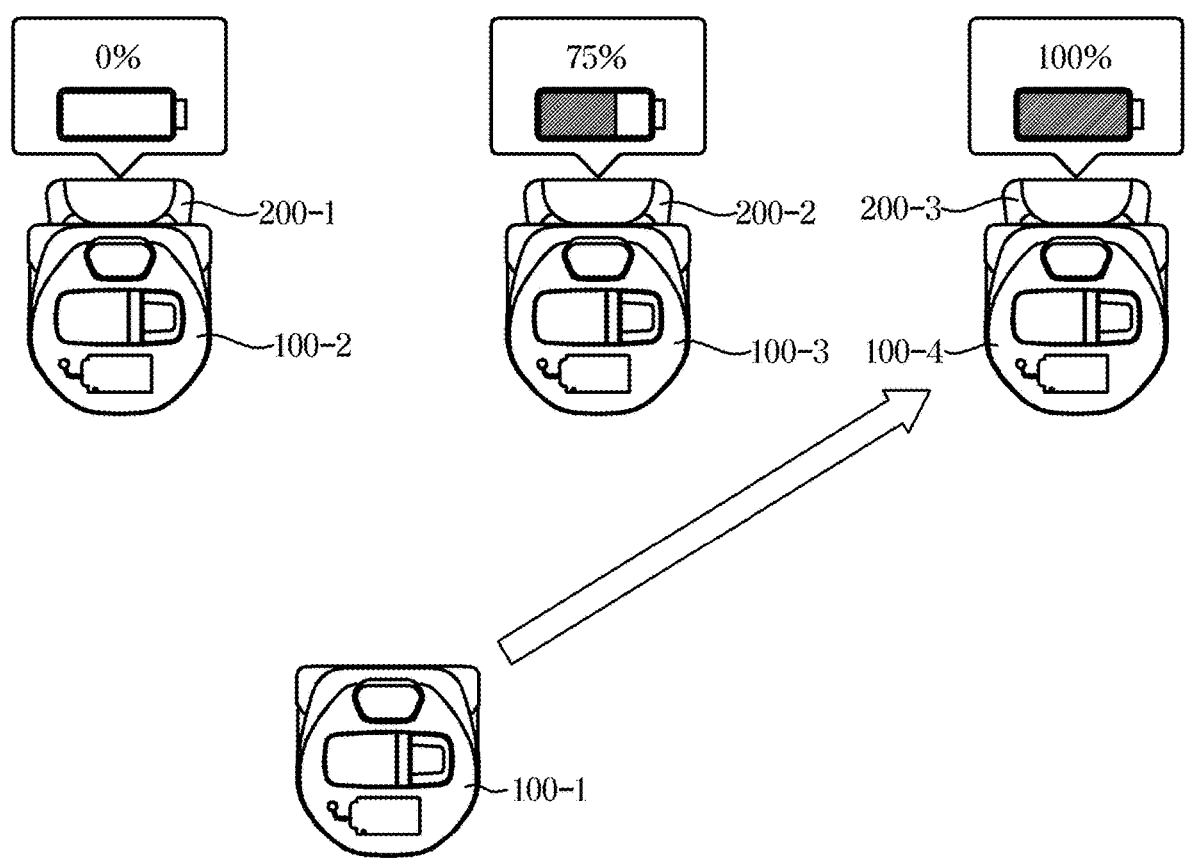
FIG. 15 illustrates how a cleaning robot determines a charging device for charging based on rates of charging progress or charging time of charging devices, according to an embodiment of the disclosure.
Figure 16:
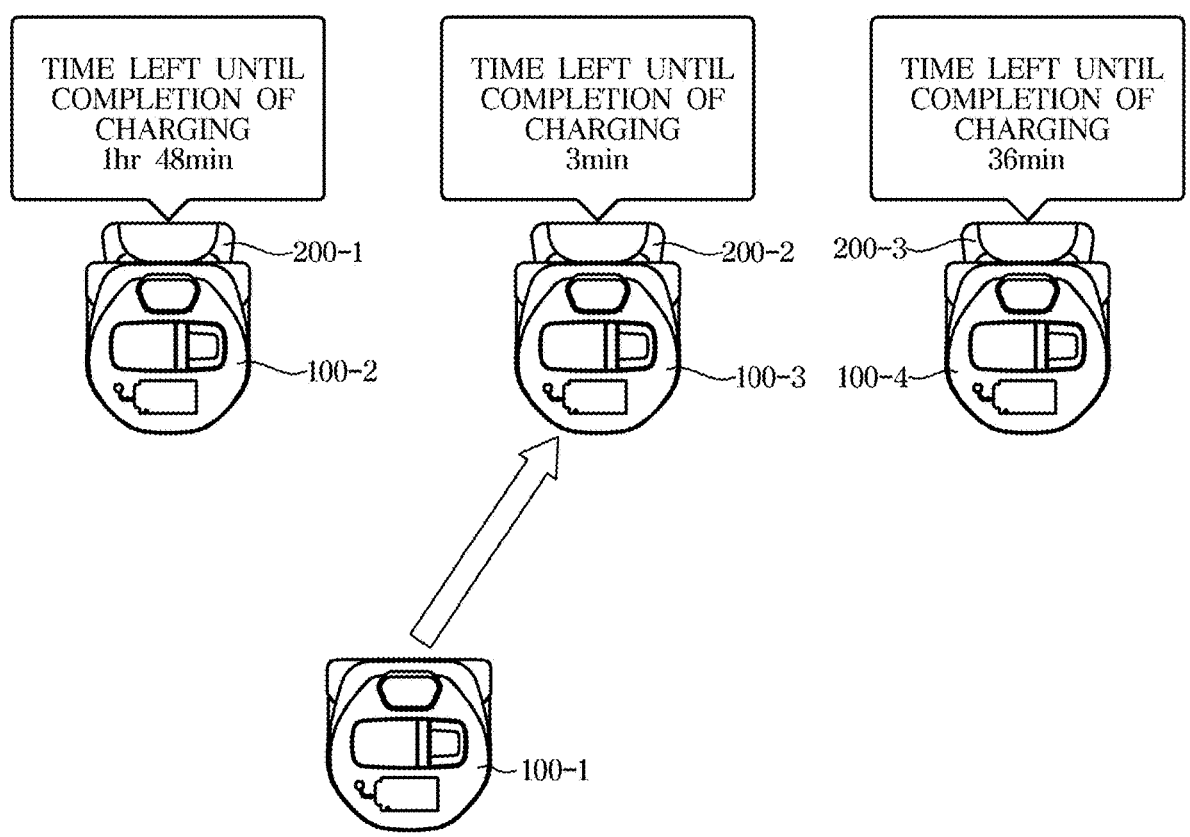
FIG. 16 illustrates how a cleaning robot determines a charging device for charging based on rates of charging progress or charging time of charging devices, according to an embodiment of the disclosure.

FIG. 8 illustrates a flowchart illustrating a controlling method of a cleaning robot, according to an embodiment of the disclosure. FIG. 9 illustrates how a cleaning robot determines a charging device for charging based on the shortest distance between charging devices and the cleaning robot, and FIG. 10 illustrates how a cleaning robot determines a charging device for charging based on the shortest distance between charging devices and the cleaning robot. FIG. 11 illustrates how a cleaning robot determines a charging device for charging based on the shortest route for the cleaning robot to avoid an obstacle and arrive at a charging device, according to an embodiment of the disclosure, and FIG. 12 illustrates how a cleaning robot determines a charging device for charging based on the shortest route for the cleaning robot to avoid an obstacle and arrive at a charging device, according to an embodiment of the disclosure; FIG. 13 illustrates how to select a charging device when a plurality of cleaning robots share charging devices, according to an embodiment of the disclosure, and FIG. 14 illustrates how to select a charging device when a plurality of cleaning robots share charging devices, according to an embodiment of the disclosure. FIG. 15 illustrates how a cleaning robot determines a charging device for charging based on rates of charging progress or charging time of charging devices, according to an embodiment of the disclosure, and FIG. 16 illustrates how a cleaning robot determines a charging device for charging based on rates of charging progress or charging time of charging devices, according to an embodiment of the disclosure.

A cleaning robot and controlling method thereof in accordance with an embodiment of the disclosure will now be described in connection with FIG. 8.

Referring to FIG. 9, a cleaning robot charging system for charging the cleaning robot 100 performing cleaning in a predefined area to be cleaned may include at least one charging devices 200: 200-1 and 200-2. Furthermore, there may be a plurality of cleaning robots 100: 100-1, 100-2, and 100-3 for cleaning the predefined area.

For convenience of explanation, in FIG. 9, the three cleaning robots 100 in the area to be cleaned are called a first cleaning robot 100-1, a second cleaning robot 100-2, and a third cleaning robot 100-3, and the two charging devices 200 for charging the cleaning robot 100 are called a first charging device 200-1 and a second charging device 200-2.

The first cleaning robot 100-1 may move to a charging device at a shortest distance based on position information of the charging devices 200-1 and 200-2, which is stored in the storage 160, when the first cleaning robot 100-1 needs to be charged while or after cleaning the area.

In the conventional occasion, referring to FIG. 9, even while the second cleaning robot 100-2 is being charged at the first charging device 200-1, the first cleaning robot 100-1 moves to the first charging device 200-1 because the first charging device 200-1 is located at the shortest distance and may collide with the second cleaning robot 100-2 being already charged.

In the embodiment of the disclosure, the first cleaning robot 100-1 requests occupancy information of at least charging device 200-1 or 200-2 from at least one of the other cleaning robots 100-2 and 100-3 through the communication module 185, in 1000.

Upon reception of the request for the occupancy information of the charging device from the first cleaning robot 100-1, the second cleaning robot 100-2 and the third cleaning robot 100-3 may each transmit the occupancy information of a charging device docked with and charging the cleaning robot to the first cleaning robot 100-1.

Specifically, when a cleaning robot docks with a charging device, the cleaning robot may obtain identification information of the charging device (e.g., ID or identification number of the charging device, etc.) through the data obtainer.

The cleaning robot may transmit the occupancy information of the charging device to another cleaning robot based on the identification information of the charging device. The occupancy information of the charging device may include at least one of whether the cleaning robot docks with the charging device for charging, time left until completion of charging of the cleaning robot being charged, and a rate of charging progress of the cleaning robot being charged.

Referring to FIG. 9, upon reception of the request for the occupancy information of the charging device from the first cleaning robot 100-1, the second cleaning robot 100-2 may transmit the occupancy information of the first charging device 200-1 docked with and charging the second cleaning robot 100-2 to the first cleaning robot 100-1.

Specifically, as the second cleaning robot 100-2 docks with and is being charged at the first charging device 200-1, the second cleaning robot 100-2 may transmit information about at least one of whether the second cleaning robot 100-2 docks with the first charging device 200-1 based on the identification information of the first charging device 200-1, time left until completion of charging of the second cleaning robot 100-2, and a rate of charging progress of the second cleaning robot 100-2 to the first cleaning robot 100-1.

Accordingly, the first cleaning robot 100-1 may be prevented from moving to the first charging device 200-1 already occupied by the second cleaning robot 100-2 and colliding with the second cleaning robot 100-2.

In the meantime, as the third cleaning robot 100-3 is not being charged at any of the first and second charging devices 200-1 and 200-2, the third cleaning robot 100-3 may not transmit any occupancy information of a charging device to the first cleaning robot 100-1.

The communication module 185 of the first cleaning robot 100-1 may receive the occupancy information of at least one charging device from at least one of other cleaning robots, in 1050. That is, the first cleaning robot 100-1 may receive the occupancy information of the first charging device 200-1 from the second cleaning robot 100-2.

When receiving the occupancy information of at least one charging device from another cleaning robot, the controller 190 of the first cleaning robot 100-1 may determine a charging device to charge the first cleaning robot 100-1 based on a distance between the first cleaning robot 100-1 and each of the at least one charging device except for the occupied charging device, and control the movement module 140 to move the first cleaning robot 100-1 to the determined charging device.

In other words, the controller 190 of the first cleaning robot 100-1 may determine whether the at least one charging device located in a predefined area is all occupied based on the occupancy information of the charging device received from other cleaning robot(s), in 1100.

When it is determined that there are charging devices not occupied, the controller 190 may determine a moving path to each of the non-occupied charging devices from the first cleaning robot 100-1, in 1150.

The controller 190 may determine whether there is an obstacle in the moving path to the non-occupied charging device from the first cleaning robot 100-1, in 1250. Such a case that there is an obstacle in the moving path will be described later in connection with FIGS. 11 and 12.

In FIG. 9, upon reception of the occupancy information of the first charging device 200-1 from the second cleaning robot 100-2, the first cleaning robot 100-1 may determine the second charging device 200-2 to charge the first cleaning robot 100-1 instead of the first charging device 200-1, and control the first cleaning robot 100-1 to move to the second charging device 200-2.

For example, the controller 190 of the first cleaning robot 100-1 may control the first cleaning robot 100-1 not to move to the first charging device 200-1 at which the second cleaning robot 100-2 is being charged and determine a moving path to the non-occupied second charging device 200-2 to move to the second charging device 200-2.

In this case, the controller 190 may calculate a shortest distance to each non-occupied charging device from the cleaning robot based on the position information of the charging device stored in the storage 160, in 1350. As shown in FIG. 9, the controller 190 may calculate a straight distance d1 to the second charging device 200-2 from the first cleaning robot 100-1.

On the other hand, referring to FIG. 10, there may be three charging devices including a third charging device 200-3 in addition to the first charging device 200-1 and the second charging device 200-2.

In the case of FIG. 10, similar to the case of FIG. 9, upon reception of the request for the occupancy information of the charging device from the first cleaning robot 100-1, the second cleaning robot 100-2 may transmit the occupancy information of the first charging device 200-1 docked with the second cleaning robot 100-2 and charging the second cleaning robot 100-2 to the first cleaning robot 100-1. As the third cleaning robot 100-3 is not being charged at any of the first to third charging devices 200-1 to 200-3, the third cleaning robot 100-3 may not transmit any occupancy information of the charging device to the first cleaning robot 100-1.

When receiving the occupancy information of the first charging device 200-1 from the second cleaning robot 100-2, the controller 190 of the first cleaning robot 100-1 may determine a charging device to charge the first cleaning robot 100-1 based on a distance between the first cleaning robot 100-1 and each of the second and third charging devices 200-2 and 200-3 other than the first charging device 200-1, and control the movement module 140 to move the first cleaning robot 100-1 to the determined charging device.

Turning back to FIG. 9, the controller 190 of the first cleaning robot 100-1 determines the second charging device 200-2 to charge the first cleaning robot 100-1 because there is one available charging device that is not occupied, i.e., the second charging device 200-2.

However, in FIG. 10, there are two charging devices, the second and third charging devices 200-2 and 200-3 that are not occupied by other cleaning robots, so the controller 190 may determine one of the non-occupied charging devices 200-2 and 200-3 based on a distance between the first cleaning robot 100-1 and each of the second and third devices 200-2 and 200-3.

Based on the position information of the second and third charging devices 200-2 and 200-3 stored in the storage 160, the controller 190 may calculate a straight distance d1 to the second charging device 200-2 and a straight distance d2 to the third charging device 200-3 from the first cleaning robot 100-1.

Based on the calculated distance information, the controller 190 may determine the third charging device 200-3 located at the shortest distance d2 from the first cleaning robot 100-1 to charge the first cleaning robot 100-1, in 1400.

The controller 190 may control the movement module 140 to move the first cleaning robot 100-1 to the third charging device 200-3, in 1450.

In other words, the controller 190 of the first cleaning robot 100-1 may control the first cleaning device 100-1 to move to the third charging device 200-3 located at the shortest distance from the first cleaning robot 100-1 among the second and third charging devices 200-2 and 200-3 other than the first charging device 200-1 at which the second cleaning robot 100-2 is being charged, and to be charged at the third charging device 200-3.

In the case as shown in FIG. 9, the first cleaning robot 100-1 may move to and dock with the second charging device 200-2 in 1500, and the data obtainer 183 of the first cleaning robot 100-1 may obtain the identification information of the second charging device 200-2 in 1550 and store the identification information in the storage 160 in 1600. The first cleaning robot 100-1 may transmit the occupancy information of the second charging device 200-2 to the second and third cleaning robots 100-2 and 100-3 based on the identification information of the second charging device 200-2 obtained by the data obtainer 183, in 1650.

In the case as shown in FIG. 10, the first cleaning robot 100-1 may move to and dock with the third charging device 200-3 in 1500, and the data obtainer 183 of the first cleaning robot 100-1 may obtain the identification information of the third charging device 200-3 in 1550 and store the identification information in the storage 160 in 1600. The first cleaning robot 100-1 may transmit the occupancy information of the third charging device 200-3 to the second and third cleaning robots 100-2 and 100-3 based on the identification information of the third charging device 200-3 obtained by the data obtainer 183, in 1650.

Turning back to FIG. 8, when the controller 190 of the first cleaning robot 100-1 determines that there is an obstacle (OB) in a moving path to a non-occupied charging device from the first cleaning robot 100-1, the controller 190 may determine a shortest route for the first cleaning robot 100-1 to avoid the obstacle OB and arrive at the non-occupied charging device, in 1300.

Referring to FIG. 11, similar to what is shown in FIG. 9, upon reception of the occupancy information of the first charging device 200-1 from the second cleaning robot 100-2, the first cleaning robot 100-1 may determine the second charging device 200-2 to charge the first cleaning robot 100-1 instead of the first charging device 200-1, and move to the second charging device 200-2.

In this case, when there is the obstacle OB in the moving path to the non-occupied second charging device 200-2 from the first cleaning robot 100-1, the controller 190 may determine a shortest route d3 for the first cleaning robot 100-1 to avoid the obstacle OB and arrive at the second charging device 200-2.

Specifically, based on the position information of the second charging device 200-2 stored in the storage 160, the controller 190 may calculate the shortest route d3 for the first cleaning robot 100-1 to avoid the obstacle OB and arrive at the second charging device 200-2.

The controller 190 may control the movement module 140 to move the first cleaning robot 00-1 along the shortest route d3 to avoid the obstacle OB and arrive at the second charging device 200-2.

Referring to FIG. 12, similar to what is shown in FIG. 10, there are two charging devices, the second and third charging devices 200-2 and 200-3, that are not occupied by other cleaning robots, so the controller 190 may determine one of them based on a distance between the first cleaning robot 100-1 and each of the second and third devices 200-2 and 200-3.

Similar to what is described in connection with FIG. 11, based on the position information of the second charging device 200-2 stored in the storage 160, the controller 190 may calculate the shortest route d3 for the first cleaning robot 100-1 to avoid the obstacle OB and arrive at the second charging device 200-2.

Furthermore, based on the position information of the third charging device 200-3 stored in the storage 160, the controller 190 may calculate a straight distance d4 to the third charging device 200-3 from the first cleaning robot 100-1.

Based on the calculated distance information, the controller 190 may determine the third charging device 200-3 among the non-occupied charging devices, which is located at the shortest distance d4 from the first cleaning robot 100-1, to charge the first cleaning robot 100-1.

That is, although the straight distance to the second charging device 200-2 is shorter than the straight distance to the third charging device 200-3, the shortest route d3 to avoid the obstacle that is in the driving path to the second charging device 200-2 is longer than the straight distance d4 to the third charging device 200-3, so the controller 190 may determine the third charging device 200-3 to charge the first cleaning robot 100-1, in 1400.

The controller 190 may control the movement module 140 to move the first cleaning robot 100-1 to the third charging device 200-3, in 1450.

In other words, the controller 190 of the first cleaning robot 100-1 may control the first cleaning device 100-1 to move to the third charging device 200-3 located at the shortest distance from the first cleaning robot 100-1 among the second and third charging devices 200-2 and 200-3 other than the first charging device 200-1 at which the second cleaning robot 100-2 is being charged, and to be charged at the third charging device 200-3.

In the case as shown in FIG. 11, the first cleaning robot 100-1 may move to and dock with the second charging device 200-2 in 1500, and the data obtainer 183 of the first cleaning robot 100-1 may obtain the identification information of the second charging device 200-2 in 1550 and store the identification information in the storage 160 in 1600. The first cleaning robot 100-1 may transmit the occupancy information of the second charging device 200-2 to the second and third cleaning robots 100-2 and 200-3 based on the identification information of the second charging device 200-2 obtained by the data obtainer 183, in 1650.

In the case as shown in FIG. 12, the first cleaning robot 100-1 may move to and dock with the third charging device 200-3 in 1500, and the data obtainer 183 of the first cleaning robot 100-1 may obtain the identification information of the third charging device 200-3 in 1550 and store the identification information in the storage 160 in 1600. The first cleaning robot 100-1 may transmit the occupancy information of the third charging device 200-3 to the second and third cleaning robots 100-2 and 100-3 based on the identification information of the third charging device 200-3 obtained by the data obtainer 183, in 1650.

Referring to FIG. 13, a plurality of cleaning robots 100 may compete with each other for the single charging device 200.

Specifically, when the first charging device 200-1 is at the nearest distance from the first and second cleaning robots 100-1 and 100-2, both the first and second cleaning robots 100-1 and 100-2 may return to the first charging device 200-1 for charging.

In this case, according to a charging system of the cleaning robot 100 in an embodiment of the disclosure, the cleaning robot 100 located at a relatively close distance to the charging device 200 or the cleaning robot 100 first approaching the charging device 200 may be charged first.

Referring to FIG. 13, when both the first and second cleaning robots 100-1 and 100-2 are returning to the first charging device 200-1 for charging, the first and second cleaning robots 100-1 and 100-2 may request the occupancy information of the first charging device 200-1 from each other.

The first charging device 200-1 is not currently occupied, so the first and second cleaning robots 100-1 and 100-2 may not receive the occupancy information of the first charging device 200-1 from each other, and thus the first and second cleaning robots 100-1 and 100-2 still move to the first charging device 200-1 for charging.

In this case, depending on a difference in moving speed or a difference in distance to the first charging device 200-1 between the first and second cleaning robots 100-1 and 100-2, one of the first and second cleaning robots 100-1 and 100-2 may arrive first at the first charging device 200-1 and dock with the first charging device 200-1.

As in FIG. 13, when the second cleaning robot 100-2 arrives first at and docks with the first charging device 200-1, the second cleaning robot 100-2 may obtain the identification information of the first charging device 200-1 and transmit the occupancy information of the first charging device 200-1 to the first cleaning robot 100-1 based on the obtained identification information.

The first cleaning robot 100-1 may receive the occupancy information of the first charging device 200-1 from the second cleaning robot 100-2 even while moving to the first charging device 200-1.

When receiving the occupancy information of the first charging device 200-1 from the second cleaning robot 100-2, the controller 190 of the first cleaning robot 100-1 may determine a charging device other than the occupied first charging device 200-1 to charge the first cleaning robot 100-1, and control the movement module 140 to move the first cleaning robot 100-1 to the determined charging device.

Referring to FIG. 13, the controller 190 of the first cleaning robot 100-1 may determine the second charging device 200-2 to charge the first cleaning robot 100-1 instead of the first charging device 200-1 docked with and charging the second cleaning robot 100-2, change the moving path of the first cleaning robot 100-1 toward the first charging device 200-1, and control the movement module 140 to move the first cleaning robot 100-1 to the second charging device 200-2.

Under the control of the controller 190 of the first cleaning robot 100-1, the first cleaning robot 100-1 may move to and dock with the second charging device 200-2, and the data obtainer 183 of the first cleaning robot 100-1 may obtain the identification information of the docked second charging device 200-2 and store the identification information in the storage 160. The first cleaning robot 100-1 may transmit the occupancy information of the second charging device 200-2 to the second cleaning robot 100-2 based on the identification information of the second charging device 200-2 obtained by the data obtainer 183.

Referring to FIG. 14, similar to what is described in connection with FIG. 13, when both the first and second cleaning robots 100-1 and 100-2 are returning to the first charging device 200-1 for charging, the first and second cleaning robots 100-1 and 100-2 may request the occupancy information of the first charging device 200-1 from each other.

When the second cleaning robot 100-2 arrives first ① at and docks with the first charging device 200-1, the second cleaning robot 100-2 may obtain the identification information of the first charging device 200-1 and transmit the occupancy information of the first charging device 200-1 to the first cleaning robot 100-1 based on the obtained identification information.

When receiving the occupancy information of the first charging device 200-1 from the second cleaning robot 100-2, the controller 190 of the first cleaning robot 100-1 may determine a charging device other than the occupied first charging device 200-1 to charge the first cleaning robot 100-1, but unlike the case of FIG. 13, when there is no other charging device, the controller 190 may control the first cleaning robot 100-1 to wait until charging of the second cleaning robot 100-2 is completed.

For example, when the second cleaning robot 100-2 docks with the first charging device 200-1 for charging, the first cleaning robot 100-1 may stop moving and wait until charging of the docked second cleaning robot 100-2 is completed.

While the second cleaning robot 100-2 is being charged and the first cleaning robot 100-1 is waiting, the first and second cleaning robots 100-1 and 100-2 may communicate the occupancy information of the first charging device 200-1 through the communication module 185. Specifically, the second cleaning robot 100-2 may transmit data of a rate of charging progress and time left until completion of charging to the first cleaning robot 100-1.

When the second cleaning robot 100-2 is completely charged after a certain time and gets out of the first charging device 200-1 ②, the first cleaning robot 100-1 may move to the first charging device 200-1 ③ and dock with the first charging device 200-1 for charging.

The data obtainer 183 of the first cleaning robot 100-1 may obtain the identification information of the first charging device 200-1 and store the identification information in the storage 160. The first cleaning robot 100-1 may transmit the occupancy information of the first charging device 200-1 to the second cleaning robot 100-2 based on the identification information of the first charging device 200-1 obtained by the data obtainer 183.

As described above, when the plurality of cleaning robots 100 compete with each other for the single charging device 200, one of the cleaning robots 100 located at a relatively close distance to the charging device 200 or one of the cleaning robots 100 first approaching the charging device 200 may be charged first while another of the cleaning robots 100 is controlled to be charged at another charging device 200 or wait until completion of charging of the cleaning robot 100 being charged.

Turning back to FIG. 8, the controller 190 of the first cleaning robot 100-1 may determine whether at least one charging device located in a predefined area is all occupied based on the occupancy information of the charging device received from other cleaning robot(s).

When it is determined that all the charging devices 200 are occupied, the controller 190 may determine one of the charging devices 200 to charge the first cleaning robot 100-1 based on at least one of rates of charging progress or time left until completion of charging of the other cleaning robots 100 docked with the occupied charging devices 200, in 1200.

Referring to FIG. 15, the second cleaning robot 100-2 docks with and is being charged at the first charging device 200-1; the third cleaning robot 100-3 docks with and is being charged at the second charging device 200-2; and a fourth cleaning robot 100-4 docks with and is being charged at the third charging device 200-3.

The second, third, and fourth cleaning robots 100-2, 100-3, and 100-4 may transmit the occupancy information of the charging devices 200-1, 200-2, and 200-3, respectively, to the first cleaning robot 100-1, and the controller 190 of the first cleaning robot 100-1 may determine that all the charging devices 200-1, 200-2, and 200-3 are currently occupied based on the received occupancy information of the charging devices 200-1, 200-2, and 200-3.

The occupancy information of the charging devices 200-1, 200-2, and 200-3 transmitted by the second, third, and fourth cleaning robots 100-2, 100-3, and 100-4 to the first cleaning robot 100-1 includes information about time left until completion of charging and rates of charging progress of the cleaning robots 100-2, 100-3, and 100-4 docking with the charging devices 200-1, 200-2, and 200-3, respectively.

The controller 190 of the first cleaning robot 100-1 may determine a charging device to charge the first cleaning robot 100-1 based on the rates of charging progress of the second to fourth cleaning robots 100-2 and 100-4.

Referring to FIG. 15, when the rate of charging progress of the second cleaning robot 100-2 docking with the first charging device 200-1 is 0%, the rate of charging progress of the third cleaning robot 100-3 docking with the second charging device 200-2 is 75%, and the rate of charging progress of the fourth cleaning robot 100-4 docking with the third charging device 200-3 is 100%, the controller 190 may determine the third charging device 200-3 having 100% of the rate of charging progress to charge the first cleaning robot 100-1.

That is, when the rate of charging progress of the fourth cleaning robot 100-4 docking with the third charging device 200-3 is 100%, the controller 190 may determine that charging at the third charging device 200-3 is completed and that the fourth cleaning robot 100-4 is going to get out of the third charging device 200-3, and control the first cleaning robot 100-1 to move to the third charging device 200-3.

Although the first cleaning robot 100-1 moves to the third charging device 200-3 because the fourth cleaning robot 100-4 docking with the third charging device 200-3 has 100% of the rate of charging progress in FIG. 15, a criterion for a charging rate to determine a charging device to charge the first cleaning robot 100-1 may be different depending on settings. For example, the controller 190 may determine a charging device to charge the first cleaning robot 100-1 based on relative rates of charging progress of a plurality of charging devices.

Under the control of the controller 190 of the first cleaning robot 100-1, the first cleaning robot 100-1 may move to and dock with the third charging device 200-3, and the data obtainer 183 of the first cleaning robot 100-1 may obtain the identification information of the docked third charging device 200-3 and store the identification information in the storage 160. The first cleaning robot 100-1 may transmit the occupancy information of the third charging device 200-3 to the second, third, and fourth cleaning robots 100-2, 100-3 and 100-4 based on the identification information of the third charging device 200-3 obtained by the data obtainer 183.

Referring to FIG. 16, similar to FIG. 15, the second cleaning robot 100-2 docks with and is being charged at the first charging device 200-1; the third cleaning robot 100-3 docks with and is being charged at the second charging device 200-2; and a fourth cleaning robot 100-4 docks with and is being charged at the third charging device 200-3.

The controller 190 of the first cleaning robot 100-1 may determine a charging device to charge the first cleaning robot 100-1 based on time left until completion of charging of the second to fourth cleaning robots 100-2 and 100-4.

As shown in FIG. 16, when the time left until completion of charging of the second cleaning robot 100-2 docking with the first charging device 200-1 is 1 hour and 48 minutes, the time left until completion of charging of the third cleaning robot 100-3 docking with the second charging device 200-2 is 3 minutes, and the time left until completion of charging of the fourth cleaning robot 100-4 docking with the third charging device 200-3 is 36 minutes, the controller 190 may determine the second charging device 200-2 having 3 minutes of time left until completion of charging to charge the first cleaning robot 100-1.

That is, when the time left until completion of charging of the third cleaning robot 100-3 docking with the second charging device 200-2 is 3 minutes, the controller 190 may determine that charging at the second charging device 200-2 will be completed soon and that the third cleaning robot 100-3 is going to get out of the second charging device 200-2, and control the first cleaning robot 100-1 to move to the second charging device 200-2.

Although the first cleaning robot 100-1 moves to the second charging device 200-2 because the third cleaning robot 100-3 docking with the second charging device 200-2 has 3 minutes of time left until completion of charging in FIG. 16, a criterion for time left until completion of charging to determine a charging device to charge the first cleaning robot 100-1 may be different depending on settings. For example, the controller 190 may determine a charging device to charge the first cleaning robot 100-1 based on relative time left until completion of charging of a plurality of charging devices.

Under the control of the controller 190 of the first cleaning robot 100-1, the first cleaning robot 100-1 may move to and dock with the second charging device 200-2, and the data obtainer 183 of the first cleaning robot 100-1 may obtain the identification information of the docked second charging device 200-2 and store the identification information in the storage 160. The first cleaning robot 100-1 may transmit the occupancy information of the second charging device 200-2 to the second, third, and fourth cleaning robots 100-2, 100-3 and 100-4 based on the identification information of the second charging device 200-2 obtained by the data obtainer 183.

As described above, according to a cleaning robot, controlling method thereof, and cleaning robot charging system in an embodiment of the disclosure, when a cleaning robot is returning to one of charging devices for charging, the cleaning device may receive occupancy information of the charging devices and return to one of the charging devices except for an occupied charging device for charging, thereby preventing collision with another cleaning robot at the occupied charging device. Furthermore, the cleaning robot may select one of the charging devices for charging based on the occupancy information indicating whether the charging devices are occupied by other cleaning robots, thereby leading to efficient distribution of charging devices.

Meanwhile, the embodiments of the disclosure may be implemented in the form of recording media for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The embodiments of the disclosure have thus far been described with reference to accompanying drawings. It will be obvious to people of ordinary skill in the art that the disclosure may be practiced in other forms than the embodiments as described above without changing the technical idea or essential features of the disclosure. The above embodiments are only by way of example, and should not be interpreted in a limited sense.

Several embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A cleaning robot comprising:
a main body including a battery;
a movement module moving the main body;
a communication module configured to request identification information of a charging device occupied by a second cleaning robot from the second cleaning robot; and
a controller configured to:
determine a non-occupied charging device not occupied by the second cleaning robot based on the identification information of the charging device received from the second cleaning robot through the communication module, and
control the movement module to move the main body to the non-occupied charging device.

2. The cleaning robot of claim 1, wherein:
there are a plurality of non-occupied charging devices, and
the controller is further configured to:
calculate a straight distance between the main body and each of the plurality of non-occupied charging devices based on the identification information of the charging device, and
control the main body to move to a charging device of the plurality of non-occupied charging devices located at a shortest distance of the calculated straight distances.

3. The cleaning robot of claim 1, wherein the controller is further configured to:

determine a route to the non-occupied charging device from the main body, and
when an obstacle exists in the route, determine the route for the main body to avoid the obstacle.

4. The cleaning robot of claim 3, wherein there are a plurality of non-occupied charging device and a plurality of routes to the plurality of non-occupied charging device, and the controller is further configured to:
determine a non-occupied charging device among the plurality of non-occupied charging devices to charge the main body based on a shortest route among the plurality of routes, and
control the movement module to move the main body to the determined non-occupied charging device.

5. The cleaning robot of claim 1, wherein the identification information of the charging device comprises:
information of whether the second cleaning robot is docked with the charging device,
time left until completion of charging of the second cleaning robot docked with the charging device, and
a rate of charging progress of the second cleaning robot docked with the charging device.

6. The cleaning robot of claim 5, wherein the controller is configured to determine one of a plurality of charging devices to charge the main body based on the rate of charging progress of each of a plurality of other cleaning robots docked with one of the plurality of charging devices when all of the plurality of charging devices are docked by one of the plurality of other cleaning robots.

7. The cleaning robot of claim 5, wherein the controller is further configured to:
determine a charging device among a plurality of charging devices docked with one of a plurality of other cleaning robots, which has 100% of the rate of charging progress, to charge the main body among the plurality of charging devices when all of the plurality of charging devices are docked by one of the plurality of other cleaning robots, and
control the movement module to move the main body to the determined charging device.

8. The cleaning robot of claim 1, further comprising a storage configured to store position information of each of a plurality of charging devices located in a predefined area,
wherein the controller is further configured to calculate a straight distance between the main body and each of the plurality of charging devices based on the position information of each of the plurality of charging devices.

9. The cleaning robot of claim 8, further comprising:
a docking module configured to detect docking between the main body and any of the plurality of charging devices; and
a data obtainer configured to obtain identification information of a charging device among the plurality of charging devices docked with the main body,
wherein the storage stores the obtained identification information of the charging device docked with the main body when the main body is docked with the charging device.

10. The cleaning robot of claim 9, wherein the communication module is further configured to transmit occupancy information of the charging device docked by the main body, the occupancy information indicating whether the main body is docked with the charging device, to the second cleaning robot based on the obtained identification information of the charging device docked with the charging device.

11. A controlling method of a cleaning robot including a main body having a battery and a movement module for moving the main body, the controlling method comprising:
  requesting identification information of a charging device occupied by a second cleaning robot from the second cleaning robot;
  receiving the requested identification information from the second cleaning robot;
  determining a non-occupied charging device not occupied by the second cleaning robot based on the received identification information of the charging device; and
  controlling the movement module to move the main body to the non-occupied charging device.

12. The controlling method of claim 11, further comprising:
  receiving identification information of a plurality of non-occupied charging devices;
  calculating a straight distance between the main body and each of the plurality of non-occupied charging devices based on the identification information of the charging device;
  determining a non-occupied charging device among the plurality of non-occupied charging devices located at a shortest distance of the calculated straight distances to charge the main body; and
  controlling the main body to move to the determined non-occupied charging device.

13. The controlling method of claim 11, further comprising:
  determining a route to the non-occupied charging device from the main body; and
  when an obstacle existing in the route, determining the route for the main body to avoid the obstacle.

14. The controlling method of claim 13, wherein there are a plurality of non-occupied charging device and a plurality of routes to the plurality of non-occupied charging device, and further comprising:
  determining a non-occupied charging device among the plurality of non-occupied charging devices to charge the main body based on a shortest route among the plurality of routes; and
  controlling the main body to move to the determined non-occupied charging device.

15. The controlling method of claim 11, further comprising determining one of a plurality of charging devices to charge the main body based on a rate of charging progress of each of a plurality of other cleaning robots docked with one of the plurality of charging devices based on all of the plurality of charging devices being docked by one of the plurality of other cleaning robots.

16. The controlling method of claim 15, further comprising:
  determining a charging device among the plurality of charging devices docked with one of the plurality of other cleaning robots, which has 100% of the rate of charging progress, to charge the main body among the plurality of charging devices based on all of the plurality of charging devices being docked by one of the plurality of other cleaning robots; and
  controlling the main body to move to the determined charging device.

17. The controlling method of claim 11, further comprising:
  storing position information of a plurality of charging devices located in a predefined area; and
  calculating a straight distance between the main body and each of the plurality of charging devices based on the position information of each of the plurality of charging devices.

18. The controlling method of claim 11, further comprising:
  detecting docking between the main body and the charging device;
  obtaining identification information of the charging device docked with the main body; and
  storing the obtained identification information of the charging device when the main body is docked with the charging device.

19. The controlling method of claim 18, further comprising transmitting occupancy information of the charging device docked by the main body, the occupancy information indicating whether the main body is docked with the charging device, to the second cleaning robot based on the obtained identification information of the charging device.

20. A cleaning robot charging system comprising:
  at least one charging device configured to charge a cleaning robot;
  a first cleaning robot configured to request occupancy information of the at least one charging device from another cleaning robot; and
  a second cleaning robot configured to:
    detect docking with one of the at least one charging device,
    obtain identification information of the docked charging device, and
    transmit occupancy information of the docked charging device to the first cleaning robot based on the obtained identification information of the docked charging device,
  wherein the first cleaning robot is further configured to:
    upon reception of the occupancy information of the docked charging device from the second cleaning robot, determine one of the at least one charging device to charge the first cleaning robot based on a distance between the first cleaning robot and each of the at least one charging device except for the docked charging device occupied by the second cleaning robot, and move to the determined charging device of the at least one charging device.

* * * * *